US012750177B2

(12) United States Patent
Lu et al.

(10) Patent No.: US 12,750,177 B2
(45) Date of Patent: Sep. 29, 2026

(54) SIGNAL RECEIVING METHOD, SIGNAL SENDING METHOD, AND CORRESPONDING APPARATUS

(71) Applicant: HUAWEI TECHNOLOGIES CO., LTD., Shenzhen (CN)

(72) Inventors: Shaozhong Lu, Beijing (CN); Xinqian Xie, Beijing (CN); Zhiheng Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 559 days.

(21) Appl. No.: 17/976,027

(22) Filed: Oct. 28, 2022

(65) Prior Publication Data

US 2023/0064862 A1 Mar. 2, 2023

Related U.S. Application Data

(63) Continuation of application No. PCT/CN2021/088503, filed on Apr. 20, 2021.

(30) Foreign Application Priority Data

Apr. 30, 2020 (CN) ......................... 202010367054.7

(51) Int. Cl.
*H04L 5/00* (2006.01)

(52) U.S. Cl.
CPC .................................. *H04L 5/0048* (2013.01)

(58) Field of Classification Search
None
See application file for complete search history.

(56) References Cited

U.S. PATENT DOCUMENTS 11,991,693 B2 * 5/2024 Gao ...................... H04W 72/23
12,355,698 B2 * 7/2025 Muruganathan ...... H04W 72/23
2012/0014349 A1 * 1/2012 Chung ............. H04W 72/0453
370/329
2013/0039304 A1 2/2013 Pan et al.
2019/0379501 A1 * 12/2019 Park ...................... H04W 16/28
2020/0052853 A1 2/2020 Qin et al.
2020/0205150 A1 * 6/2020 Cheng ................... H04W 72/23
2022/0239352 A1 * 7/2022 Hakola ................. H04L 5/0023
(Continued)

FOREIGN PATENT DOCUMENTS

CN 105991264 A 10/2016
CN 108260217 A 7/2018
CN 110034875 A 7/2019

OTHER PUBLICATIONS

Extended European Search Report dated Sep. 14, 2023 issued for European Patent Application No. 21797768.5 (8 pages).
(Continued)

*Primary Examiner* — Gregory B Sefcheck
*Assistant Examiner* — Benjamin Peter Welte

(57) ABSTRACT

A method and corresponding apparatus includes: a terminal device receiving indication information from a network device, where the indication information indicates at least one SRS resource, and the at least one SRS resource corresponds to a receive antenna to be used by the terminal device to receive a downlink signal. The terminal device receives the downlink signal from the network device by using the receive antenna corresponding to the at least one SRS resource.

20 Claims, 6 Drawing Sheets

(56) References Cited

U.S. PATENT DOCUMENTS

| | | | | |
|---|---|---|---|---|
| 2023/0076139 | A1* | 3/2023 | Muruganathan | H04L 5/0023 |
| 2023/0171763 | A1* | 6/2023 | Gao | H04W 72/23 |

OTHER PUBLICATIONS

3GPP TSG-RAN WG1 NR Ad Hoc #3 R1-1716342,UL MIMO for non-codebook based transmission, Ericsson, Nagoya, Japan, Sep. 18-21, 2017, total 5 pages.

International Search Report and Written Opinion issued in PCT/CN2021/088503, dated Jul. 21, 2021, 9 pages.

Office Action issued in IN202247065864 dated Jan. 9, 2023, 6 pages.

* cited by examiner

SIGNAL RECEIVING METHOD, SIGNAL SENDING METHOD, AND CORRESPONDING APPARATUS

CROSS-REFERENCE TO RELATED APPLICATIONS

This application is a continuation of International Application No. PCT/CN2021/088503, filed on Apr. 20, 2021, which claims priority to Chinese Patent Application No. 202010367054.7, filed on Apr. 30, 2020. The disclosures of the aforementioned applications are hereby incorporated by reference in their entireties.

TECHNICAL FIELD

This disclosure relates to the field of communication technologies, and in particular, to a signal receiving method, a signal sending method, and a corresponding apparatus.

BACKGROUND

5th generation mobile communication technology (5G) new radio (NR) wireless communication systems have higher deployment frequency bands than long term evolution (LTE) wireless communication systems and long term evolution-advanced (LTE-A) wireless communication systems, to obtain wider communication bandwidth. As a communication frequency increases, a size of an antenna may be further reduced. When an area of an antenna panel is the same, a quantity of antenna elements in NR is far greater than quantities of antenna elements in LTE and LTE-A. This helps obtain a diversity gain and implement spatial multiplexing, to further improve spectral efficiency in NR.

As a quantity of antenna elements increases, a quantity of radio frequency links also increases linearly. A radio frequency link includes an expensive digital-to-analog/analog-to-digital converter and the like. Therefore, increasing the quantity of antenna elements requires high expenses and energy costs. Therefore, for most NR terminal devices, a quantity of radio frequency channels is less than a quantity of actual antenna ports. Digital beamforming (DBF) may be performed on an antenna port in one-drive-one mode, or analog beamforming (ABF) may be performed on an antenna port in one-drive-X mode, where X>1. To make full use of these antennas, most NR terminal devices can support a function of selecting a receive antenna and/or a receive ABF beam, to maximally improve receiving performance of the NR terminal devices.

Currently, measurement, selection, and switching of an antenna port and/or a beam of a terminal device are all implemented on a terminal device side. First, a network device sends a channel state information-reference signal (CSI-RS) to the terminal device, and the terminal device measures channel information of all antenna ports and/or beams based on the CSI-RS. Then, the terminal device selects, based on measurement results of all the antenna ports and/or beams, a group of antenna ports and/or beams with optimal receiving performance as a receive antenna port and/or a receive beam of the terminal device.

Because a quantity of actual antenna ports of the terminal device is usually greater than a quantity of receive antenna ports (namely, a quantity of radio frequency receive channels), the terminal device can measure channel information of only a part of antenna ports and/or beams at a time. For example, as shown in FIG. 1, a terminal device has eight antenna ports, but has only four radio frequency receive channels. Therefore, the terminal device maximally measures channel information of four antenna ports and/or channel information of beams on the four antenna ports at a time. If the terminal device needs to measure channel information of all the antenna ports and/or beams, antenna port and/or beam switching is required.

However, the antenna port and/or beam switching of the terminal device takes a long time period, and the terminal device cannot receive a downlink signal within the switching time period. In addition, after the antenna port and/or beam switching of the terminal device, an adverse channel change may be further caused, resulting in sharp deterioration of receiving performance of the terminal device.

SUMMARY

Embodiments of this disclosure provide a signal receiving method, a signal sending method, and a corresponding apparatus, to improve downlink-signal receiving performance of a terminal device in a case of antenna port and/or beam switching.

According to a first aspect, a signal receiving method is provided. The method includes: A terminal device receives indication information from a network device, where the indication information indicates at least one sounding reference signal SRS resource, and the at least one SRS resource corresponds to a receive antenna to be used by the terminal device to receive a downlink signal. The terminal device receives the downlink signal from the network device by using the receive antenna corresponding to the at least one SRS resource.

In this embodiment of this disclosure, the network device indicates the receive antenna (including an antenna port and/or a beam) to the terminal device, to avoid problems in a conventional technology that are caused by switching a receive antenna port by a terminal device, such as a failure to receive a downlink signal within a switching time period and deterioration of receiving performance induced after the switching, so that downlink spectral efficiency can be improved.

In a possible implementation, that the at least one SRS resource corresponds to a receive antenna to be used by the terminal device to receive a downlink signal includes: The at least one SRS resource includes at least one first SRS resource and at least one second SRS resource, where each of the at least one first SRS resource includes at least one first SRS port, and each first SRS port is associated with one antenna port; and each of the at least one second SRS resource includes at least one second SRS port, and each second SRS port is associated with at least two antenna ports.

In this implementation, the network device may configure two types of resources, namely, the first SRS resource and the second SRS resource, for the terminal device. The network device may select a receive antenna port and/or a receive beam for the terminal device based on an association relationship between a first SRS resource and an antenna port of the terminal device and an association relationship between a second SRS resource and both an antenna port and a beam of the terminal device, and indicate the receive antenna port and/or the receive beam to the terminal device, to improve reliability of this solution.

In a possible implementation, the terminal device determines a first receive antenna port based on the first SRS resource in the at least one SRS resource, determines a second receive antenna port and a receive beam based on the second SRS resource in the at least one SRS resource, and receives the downlink signal from the network device by using the determined first receive antenna port, second receive antenna port, and receive beam.

In this implementation, the terminal device may learn of, from the indication information based on the association relationship between a first SRS resource and an antenna port of the terminal device and the association relationship between a second SRS resource and both an antenna port and a beam of the terminal device, the first receive antenna port, the second receive antenna port, and the receive beam that are selected by the network device for the terminal device, and further receive the downlink signal from the network device by using the first receive antenna port, the second receive antenna port, and the receive beam, to improve the reliability of this solution.

In a possible implementation, that each second SRS port is associated with at least two antenna ports includes: Each first SRS port is associated with one antenna port, each second SRS port corresponds to a plurality of first SRS ports, and different spatial relationship information is configured for second SRS resources to which a plurality of second SRS ports corresponding to a same first SRS port belong.

In this implementation, one second SRS port corresponds to a plurality of first SRS ports, and one first SRS port is associated with one actual physical antenna port. Therefore, one second SRS port is indirectly associated with a plurality of physical antenna ports. Association between the second SRS port of the second SRS resource and the first SRS port of the first SRS resource achieves a technical effect of associating the second SRS resource with a plurality of actual physical antenna ports. Different spatial relationship information is configured for second SRS resources to which a plurality of second SRS ports corresponding to a same first SRS port belong, so that ABF beams are configured based on a plurality of physical antenna ports.

In a possible implementation, the terminal device may further send an SRS on the at least one first SRS resource and the at least one second SRS resource, where the indication information is generated by the network device based on the SRS, and the at least one first SRS resource and/or the at least one second SRS resource are/is configured by the network device.

In this implementation, the terminal device sends the SRS on the at least one first SRS resource and the at least one second SRS resource, so that the network device can test receiving performance of each antenna port and/or beam based on these SRSs, further select the receive antenna port and/or the receive beam for the terminal device based on test results, and generate the indication information based on an SRS resource corresponding to the receive antenna port and/or the receive beam, to ensure the reliability of this solution.

In a possible implementation, the indication information includes an SRS resource ID and an SRS port ID of the SRS resource corresponding to the receive antenna.

In this implementation, the indication information carries SRS resource information of the receive antenna port and/or the receive beam, so that a change to a protocol is slight, and performance of the receive antenna port and/or the receive beam selected by the network device is excellent.

In a possible implementation, the indication information includes an index value, in a first subset, of a combination of an SRS resource ID and an SRS port ID of the SRS resource corresponding to the receive antenna. The first subset includes an SRS resource ID and an SRS port ID of an SRS resource corresponding to each of a plurality of receive antenna combinations, and an index value of a combination of the SRS resource ID and the SRS port ID of the SRS resource corresponding to each receive antenna combination, where the index value of the combination of the SRS resource ID and the SRS port ID of the SRS resource corresponding to each receive antenna combination is unique in the first subset.

In this implementation, the indication information carries index information of the receive antenna port and/or the receive beam, so that overheads of signaling design are low, and calculation complexity of selecting the receive antenna port and/or the receive beam by the network device is low.

In a possible implementation, the first subset is a proper subset of a universal set including all possible receive antenna combinations of the terminal device, and receiving performance of each receive antenna combination in the first subset meets a preset condition.

This implementation can ensure that receiving performance of the receive antenna port and/or the receive beam selected by the network device from the first subset definitely meets the preset condition, and that a quantity of selectable receive antenna combinations in the first subset is small, so that efficiency of selecting the receive antenna port and/or the receive beam by the network device for the terminal device can be improved.

In a possible implementation, before the terminal device receives the indication information from the network device, the terminal device may further send antenna information of the terminal device to the network device. The antenna information corresponds to the first subset, the first subset is one of a plurality of subsets, and the plurality of subsets correspond to different antenna information.

In this implementation, the network device may select, based on the antenna information reported by the terminal device, the first subset corresponding to the antenna information of the terminal device, and select the receive antenna port and/or the receive beam from the first subset. This can ensure that the receive antenna port and/or the receive beam selected by the network device for the terminal device match/matches the antenna information of the terminal device, to better ensure receiving performance of the terminal device.

In a possible implementation, the antenna information includes one or more of the following: a quantity of radio frequency transmit channels, a quantity of radio frequency receive channels, a total quantity of antenna ports, or a quantity of analog beams, where one analog beam is generated by at least two antenna ports.

In a possible implementation, the indication information is carried in a MAC CE or DCI.

According to a second aspect, a signal sending method is provided. The method includes: A network device sends indication information to a terminal device, where the indication information indicates at least one sounding reference signal SRS resource, and the at least one SRS resource corresponds to a receive antenna to be used by the terminal device to receive a downlink signal. The network device sends the downlink signal to the terminal device.

In a possible implementation, that the at least one SRS resource corresponds to a receive antenna to be used by the terminal device to receive a downlink signal includes: The at least one SRS resource includes at least one first SRS resource and at least one second SRS resource, where each of the at least one first SRS resource includes at least one first SRS port, and each first SRS port is associated with one antenna port; and each of the at least one second SRS resource includes at least one second SRS port, and each second SRS port is associated with at least two antenna ports.

In a possible implementation, the network device may further determine a first SRS resource corresponding to a first receive antenna port of the terminal device and a second SRS resource corresponding to a second receive antenna port and a receive beam of the terminal device. The network device generates the indication information based on the first SRS resource corresponding to the first receive antenna port of the terminal device and the second SRS resource corresponding to the second receive antenna port and the receive beam of the terminal device.

In a possible implementation, that each second SRS port is associated with at least two antenna ports includes: Each first SRS port is associated with one antenna port, each second SRS port corresponds to a plurality of first SRS ports, and different spatial relationship information is configured for second SRS resources to which a plurality of second SRS ports corresponding to a same first SRS port belong.

In a possible implementation, the network device may further receive an SRS from the terminal device on the at least one first SRS resource and the at least one second SRS resource, where the first receive antenna port of the terminal device and the second receive antenna port and the receive beam of the terminal device are determined by the network device based on the SRS, and the at least one first SRS resource and the at least one second SRS resource are configured by the network device.

In a possible implementation, the indication information includes an SRS resource ID and an SRS port ID of the SRS resource corresponding to the receive antenna.

In a possible implementation, the indication information includes an index value, in a first subset, of a combination of an SRS resource ID and an SRS port ID of the SRS resource corresponding to the receive antenna. The first subset includes an SRS resource ID and an SRS port ID of an SRS resource corresponding to each of a plurality of receive antenna combinations, and an index value of a combination of the SRS resource ID and the SRS port ID of the SRS resource corresponding to each receive antenna combination, where the index value of the combination of the SRS resource ID and the SRS port ID of the SRS resource corresponding to each receive antenna combination is unique in the first subset.

In a possible implementation, the first subset is a proper subset of a universal set including all possible receive antenna combinations of the terminal device, and receiving performance of each receive antenna combination in the first subset meets a preset condition.

In a possible implementation, before the network device generates the indication information, the network device receives antenna information from the terminal device, where the antenna information corresponds to the first subset, the first subset is one of a plurality of subsets, and the plurality of subsets correspond to different antenna information.

In a possible implementation, the antenna information includes one or more of the following: a quantity of radio frequency transmit channels, a quantity of radio frequency receive channels, a total quantity of antenna ports, or a quantity of analog beams, where one analog beam is generated by at least two antenna ports.

In a possible implementation, the indication information is carried in a MAC CE or DCI.

According to a third aspect, a signal receiving apparatus is provided. The apparatus may be a terminal device or an apparatus on the terminal device, and the apparatus includes a module configured to perform the method according to any one of the first aspect or the possible implementations of the first aspect.

For example, the apparatus may include: a receiving module, configured to receive indication information from a network device, where the indication information indicates at least one sounding reference signal SRS resource, and the at least one SRS resource corresponds to a receive antenna to be used by the apparatus to receive a downlink signal; and a processing module, configured to control the receiving module to receive the downlink signal from the network device by using the receive antenna corresponding to the at least one SRS resource.

In a possible implementation, that the at least one SRS resource corresponds to a receive antenna to be used by the apparatus to receive a downlink signal may include: The at least one SRS resource includes at least one first SRS resource and at least one second SRS resource, where each of the at least one first SRS resource includes at least one first SRS port, and each first SRS port is associated with one antenna port; and each of the at least one second SRS resource includes at least one second SRS port, and each second SRS port is associated with at least two antenna ports.

In a possible implementation, the processing module is specifically configured to: determine a first receive antenna port based on the first SRS resource in the at least one SRS resource, and determine a second receive antenna port and a receive beam based on the second SRS resource in the at least one SRS resource; and control the receiving module to receive the downlink signal from the network device by using the determined first receive antenna port, second receive antenna port, and receive beam.

In a possible implementation, that each second SRS port is associated with at least two antenna ports may include: Each first SRS port is associated with one antenna port, each second SRS port corresponds to a plurality of first SRS ports, and different spatial relationship information is configured for second SRS resources to which a plurality of second SRS ports corresponding to a same first SRS port belong.

In a possible implementation, the apparatus may further include a sending module, configured to send an SRS on the at least one first SRS resource and the at least one second SRS resource, where the indication information is generated by the network device based on the SRS, and the at least one first SRS resource and/or the at least one second SRS resource are/is configured by the network device.

In a possible implementation, the indication information may include an index value, in a first subset, of a combination of an SRS resource ID and an SRS port ID of the SRS resource corresponding to the receive antenna. The first subset may include an SRS resource ID and an SRS port ID of an SRS resource corresponding to each of a plurality of receive antenna combinations, and an index value of a combination of the SRS resource ID and the SRS port ID of the SRS resource corresponding to each receive antenna combination, where the index value of the combination of the SRS resource ID and the SRS port ID of the SRS resource corresponding to each receive antenna combination is unique in the first subset.

In a possible implementation, the apparatus may further include: the sending module, configured to: before the receiving module receives the indication information from the network device, send antenna information of the apparatus to the network device, where the antenna information corresponds to the first subset, the first subset is one of a plurality of subsets, and the plurality of subsets correspond to different antenna information.

In a possible implementation, the antenna information may include one or more of the following: a quantity of radio frequency transmit channels, a quantity of radio frequency receive channels, a total quantity of antenna ports, or a quantity of analog beams, where one analog beam is generated by at least two antenna ports.

According to a fourth aspect, a signal sending apparatus is provided. The apparatus may be a network device or an apparatus on the network device, and the apparatus may include a module configured to perform the method according to any one of the second aspect or the possible implementations of the second aspect.

For example, the apparatus may include: a processing module, configured to generate indication information, where the indication information indicates at least one sounding reference signal SRS resource, and the at least one SRS resource corresponds to a receive antenna to be used by a terminal device to receive a downlink signal; and a sending module, configured to: send the indication information to the terminal device, and send the downlink signal to the terminal device.

In a possible implementation, that the at least one SRS resource corresponds to a receive antenna to be used by a terminal device to receive a downlink signal may include: The at least one SRS resource includes at least one first SRS resource and at least one second SRS resource, where each of the at least one first SRS resource includes at least one first SRS port, and each first SRS port is associated with one antenna port; and each of the at least one second SRS resource includes at least one second SRS port, and each second SRS port is associated with at least two antenna ports.

In a possible implementation, the processing module is configured to: determine a first SRS resource corresponding to a first receive antenna port of the terminal device and a second SRS resource corresponding to a second receive antenna port and a receive beam of the terminal device, and generate the indication information based on the first SRS resource corresponding to the first receive antenna port of the terminal device and the second SRS resource corresponding to the second receive antenna port and the receive beam of the terminal device.

In a possible implementation, that each second SRS port is associated with at least two antenna ports may include: Each first SRS port is associated with one antenna port, each second SRS port corresponds to a plurality of first SRS ports, and different spatial relationship information is configured for second SRS resources to which a plurality of second SRS ports corresponding to a same first SRS port belong.

In a possible implementation, the apparatus may further include: a receiving module, configured to receive an SRS from the terminal device on the at least one first SRS resource and the at least one second SRS resource, where the first receive antenna port of the terminal device and the second receive antenna port and the receive beam of the terminal device are determined by the apparatus based on the SRS, and the at least one first SRS resource and the at least one second SRS resource are configured by the apparatus.

In a possible implementation, the indication information may include an index value, in a first subset, of a combination of an SRS resource ID and an SRS port ID of the SRS resource corresponding to the receive antenna. The first subset may include: an SRS resource ID and an SRS port ID of an SRS resource corresponding to each of a plurality of receive antenna combinations, and an index value of a combination of the SRS resource ID and the SRS port ID of the SRS resource corresponding to each receive antenna combination, where the index value of the combination of the SRS resource ID and the SRS port ID of the SRS resource corresponding to each receive antenna combination is unique in the first subset.

In a possible implementation, the apparatus may further include the receiving module, configured to: before the processing module generates the indication information, receive antenna information from the terminal device, where the antenna information corresponds to the first subset, the first subset is one of a plurality of subsets, and the plurality of subsets correspond to different antenna information.

In a possible implementation, the antenna information may include one or more of the following: a quantity of radio frequency transmit channels, a quantity of radio frequency receive channels, a total quantity of antenna ports, or a quantity of analog beams, where one analog beam is generated by at least two antenna ports.

According to a fifth aspect, a communication apparatus is provided. The communication apparatus includes at least one processor, and a memory and a communication interface that communicate with and are connected to the at least one processor. The memory stores instructions executable by the at least one processor, and the at least one processor executes the instructions stored in the memory, to enable the apparatus to perform the method according to any one of the first aspect or the optional implementations of the first aspect or the method according to any one of the second aspect or the optional implementations of the second aspect.

According to a sixth aspect, a computer-readable storage medium is provided. The computer-readable storage medium includes a program or instructions. When the program or the instructions is/are run on a computer, the method according to any one of the first aspect or the optional implementations of the first aspect or the method according to any one of the second aspect or the optional implementations of the second aspect is performed.

According to a seventh aspect, a computer program product is provided. When the computer program product runs on a computer, the method according to any one of the first aspect or the optional implementations of the first aspect or the method according to any one of the second aspect or the optional implementations of the second aspect is performed.

According to an eighth aspect, a chip is provided. The chip is coupled to a memory, and is configured to read and execute program instructions stored in the memory, to implement the method according to any one of the first aspect or the optional implementations of the first aspect or the method according to any one of the second aspect or the optional implementations of the second aspect.

For beneficial effects of the implementations in the second aspect to the eighth aspect, refer to the beneficial effects of the corresponding implementations in the first aspect. Details are not described herein again.

DESCRIPTION OF EMBODIMENTS

To resolve problems that a terminal device cannot receive a downlink signal during antenna port and/or beam switching and receiving performance of the terminal device deteriorates after the antenna port and/or beam switching, embodiments of this disclosure provide a signal receiving method, a signal sending method, and a corresponding apparatus.

Technical solutions in embodiments of this disclosure may be applied to various wireless communication systems, for example, 5th generation (5G) systems such as an NR system and future communication systems such as a 6G system. Certainly, the technical solutions in embodiments of this disclosure may also be applied to other communication systems, provided that the communication systems have a requirement for selecting an antenna port and/or a beam.

Figure 2:
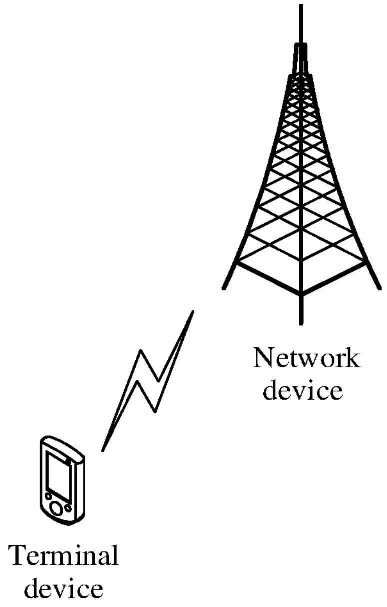
FIG. 2 is a schematic diagram of a network architecture of a communication system according to an embodiment of this disclosure.

For example, FIG. 2 is a schematic diagram of a network architecture of a communication system according to an embodiment of this disclosure. The communication system includes a network device and a terminal device. The network device may send a downlink signal to the terminal device, and the terminal device may receive the downlink signal from the network device. Certainly, the terminal device may send an uplink signal to the network device, and the network device may receive the uplink signal from the terminal device.

In embodiments of this disclosure, the network device may configure sounding reference signal (SRS) resources for the terminal device. These SRS resources have a definite association relationship with antenna ports and/or beams of the terminal device. The terminal device sends an SRS on each antenna port and/or beam through the SRS resource configured by the network device. The network device obtains sending performance of each antenna port and/or beam by measuring these SRSs of the terminal device, then determines receiving performance of each antenna port and/or beam based on correlation or reciprocity between an uplink channel and a downlink channel, further selects, for the terminal device, an antenna port and/or a beam whose receiving performance meets a preset condition as a receive antenna port and/or a receive beam of the terminal device, and finally notifies the determined receive antenna port and/or receive beam to the terminal device by using signaling. After receiving the signaling, the terminal device determines the receive antenna port and/or the receive beam based on the signaling, and receives a downlink signal from the network device through the receive antenna port and/or the receive beam.

To complete measurement of downlink channel information, the terminal device in embodiments of this disclosure needs to switch only a transmit antenna port and/or a transmit beam to send the SRS, but does not need to switch the receive antenna port and/or the receive beam to receive a CSI-RS. Therefore, problems caused by receive antenna switching such as a failure of the terminal device to receive a downlink signal within a switching time period and deterioration of receiving performance induced after the switching can be effectively avoided, thereby improving downlink spectral efficiency. In addition, because uplink sending can be controlled by the terminal device, when switching the transmit antenna port and/or the transmit beam, the terminal device can avoid impact on the uplink sending, in other words, ensure sending performance of the terminal device.

The following clearly describes the technical solutions in embodiments of this disclosure with reference to the accompanying drawings in embodiments of this disclosure. To make embodiments of this disclosure clearer, the following further provides unified descriptions of some content and concepts related to embodiments of this disclosure.

(1) A terminal device is also referred to as a terminal, is a user-side entity for receiving or transmitting a signal, and is configured to send an uplink signal to a network device or receive a downlink signal from the network device. The terminal device includes a device that provides a user with a voice and/or data connectivity, for example, may include a handheld device having a wireless connection function or a processing device connected to a wireless modem. The terminal device may communicate with a core network through a radio access network (RAN), and exchange a voice and/or data with the RAN. The terminal device may include user equipment (UE), a V2X terminal device, a wireless terminal device, a mobile terminal device, a device-to-device (D2D) terminal device, a machine-to-machine/machine type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus, for example, a personal communications service (PCS) phone, a cordless telephone set, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

By way of example and not limitation, in embodiments of this disclosure, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on the body or integrated into clothes or an accessory of a user. The wearable device is not only a hardware device, but also implements powerful functions through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

If the terminal devices described above are located in vehicles (for example, placed in the vehicles or mounted in the vehicles), the terminal devices may be all considered as vehicle-mounted terminal devices. For example, the vehicle-mounted terminal devices are also referred to as on-board units (OBUs).

(2) A network device is configured to: receive an uplink signal from a terminal device or send a downlink signal to the terminal device. For example, the network device includes an access network (AN) device and a radio access network (RAN) device. The access network device is, for example, a base station (for example, an access point), and may be a device, in an access network, that communicates with a wireless terminal device over an air interface through one or more cells. The base station may be configured to mutually convert a received over-the-air frame and an internet protocol (IP) packet, and serve as a router between the terminal device and a remaining part of the access network. The remaining part of the access network may include an IP network. The network device may further coordinate attribute management of the air interface. For example, the network device may include an evolved NodeB (NodeB, eNB, or e-NodeB) in a long term evolution (LTE) system or a long term evolution-advanced (LTE-A) system; may include a next generation NodeB (gNB), a next generation evolved NodeB (ng-eNB), or an en-gNB (gNB) in a 5th generation mobile communication technology (5G) new radio (NR) system; may include a centralized unit (CU) and a distributed unit (DU) in a cloud radio access network (Cloud RAN) system; or may include a relay device. This is not limited in embodiments of this disclosure.

In embodiments of this disclosure, the network device may further include a core network device. The core network device includes, for example, a network device that processes and forwards signaling and data of a user. In a 4G system, a core network device is, for example, a mobility management entity (MME). The MME is a key control node for an access network of an LTE system defined in the 3rd generation partnership project (3GPP) protocol, and is responsible for idle mode terminal device positioning and paging procedures and the like including retransmissions. Briefly, the MME is a core network device responsible for signaling processing. Alternatively, in a 5G system, a core network device is, for example, an access management network element, a session management network element, or a user plane gateway. The user plane gateway may be a server that has functions such as mobility management, routing, and forwarding specific to user plane data, and is usually on a network side. For example, the user plane gateway is a serving gateway (SGW), a packet data network gateway (PGW), or a user plane function (UPF).

(3) An SRS resource indicates a time domain resource, a frequency domain resource, a space domain resource, and the like used by a terminal to send an SRS.

(4) An SRS resource set is a set of SRS resources that have a same function and a same resource type.

Figure 1:
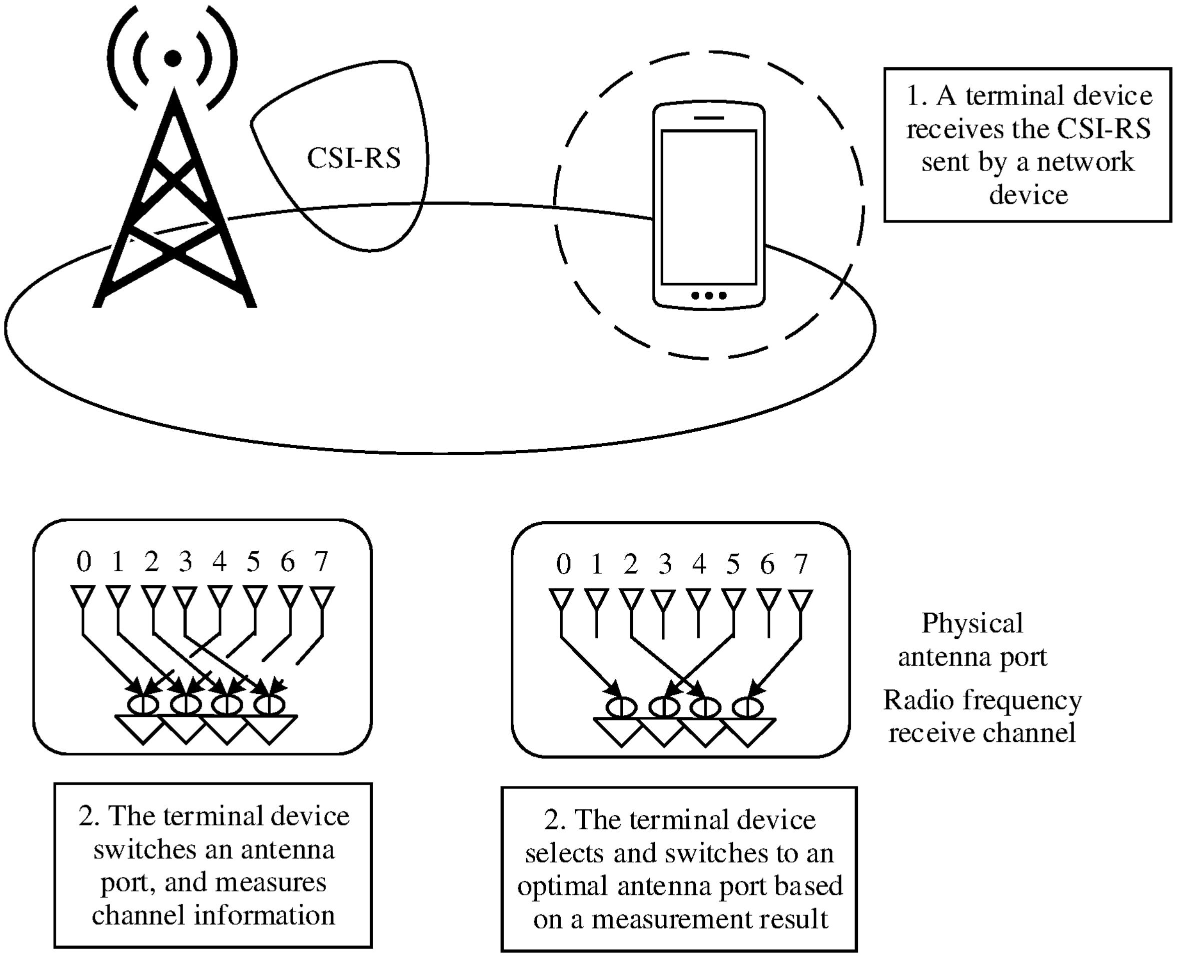
FIG. 1 is a schematic diagram of antenna port and/or beam switching of a terminal device in a conventional technology.

(5) An antenna port is an actual physical antenna port of a terminal device, for example, antenna ports 0 to 7 in FIG. 1.

(6) A receive antenna port is a physical antenna port used by a terminal device to receive a signal. A quantity of receive antenna ports is consistent with a quantity of radio frequency receive channels of the terminal device, and cannot exceed and is usually less than a total quantity of physical antenna ports of the terminal device.

Correspondingly, a physical antenna port used by the terminal device to send a signal is a transmit antenna port. A quantity of transmit antenna ports is consistent with a quantity of radio frequency transmit channels of the terminal device, and is usually less than the total quantity of physical antenna ports of the terminal device.

(7) An SRS port is virtualized in an SRS resource, and indicates an antenna port for sending an SRS. One SRS resource includes one or more SRS ports. There is a definite correspondence between an SRS port and an antenna port. For example, one SRS port corresponds to one or more actual physical antenna ports.

(8) Beams include two types of beams: an analog beamforming (analog beamforming, ABF) beam and a digital beamforming (DBF) beam.

In a wireless communication system, high-frequency radio signals propagated in the air are basically analog signals, and components inside a base station or a terminal device process digital signals. Therefore, undoubtedly, a digital-to-analog converter (DAC) exists at a signal transmit end, and an analog-to-digital converter (ADC) exists at a receive end. A main difference between ABF and DBF lies in: A transmit end of the ABF completes signal processing, namely, beamforming, after digital-to-analog conversion, in other words, processes an analog signal, and a receive end of the ABF completes signal processing, namely, beamforming, before analog-to-digital conversion, in other words, processes an analog signal. A transmit end of the DBF completes signal processing, namely, beamforming, before digital-to-analog conversion, in other words, processes a digital signal, and a receive end of the DBF completes signal processing, namely, beamforming, after analog-to-digital conversion, in other words, processes a digital signal.

There are too many antennas in 5G NR. Therefore, to reduce antenna complexity and power consumption, an ABF antenna or both an ABF antenna and a DBF antenna is/are usually considered to be used in 5G NR.

In embodiments of this disclosure, a beam sent or received by the ABF antenna is referred to as an analog beam or an ABF beam. One analog beam may be generated by one antenna port, or may be generated by a combination of two or more antenna ports. This is not limited herein.

It should be understood that in this specification, unless otherwise specified, a beam in this specification is an analog beam.

(9) The terms "system" and "network" may be used interchangeably in embodiments of this disclosure. "At least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between associated objects. "At least one of the following items (pieces)" or a similar expression thereof refers to any combination of these items, including any combination of singular items (pieces) or plural items (pieces). For example, at least one of a, b, or c may represent a, b, c, a and b, a and c, b and c, or a, b, and c.

In addition, unless otherwise stated, ordinal numbers such as "first" and "second" in embodiments of this disclosure are for distinguishing between a plurality of objects, but are not intended to limit a sequence, a time sequence, priorities, or importance of the plurality of objects. For example, a first priority criterion and a second priority criterion are merely for distinguishing between different criteria, but do not indicate a difference between content, priorities, importance, or the like of the two criteria.

In addition, the terms "include/comprise" and "have" in embodiments, the claims, and the accompanying drawings of this disclosure are not exclusive. For example, a process, a method, a system, a product, or a device including a series of steps or modules is not limited to the listed steps or modules, and may further include steps or modules that are not listed.

Figure 3:
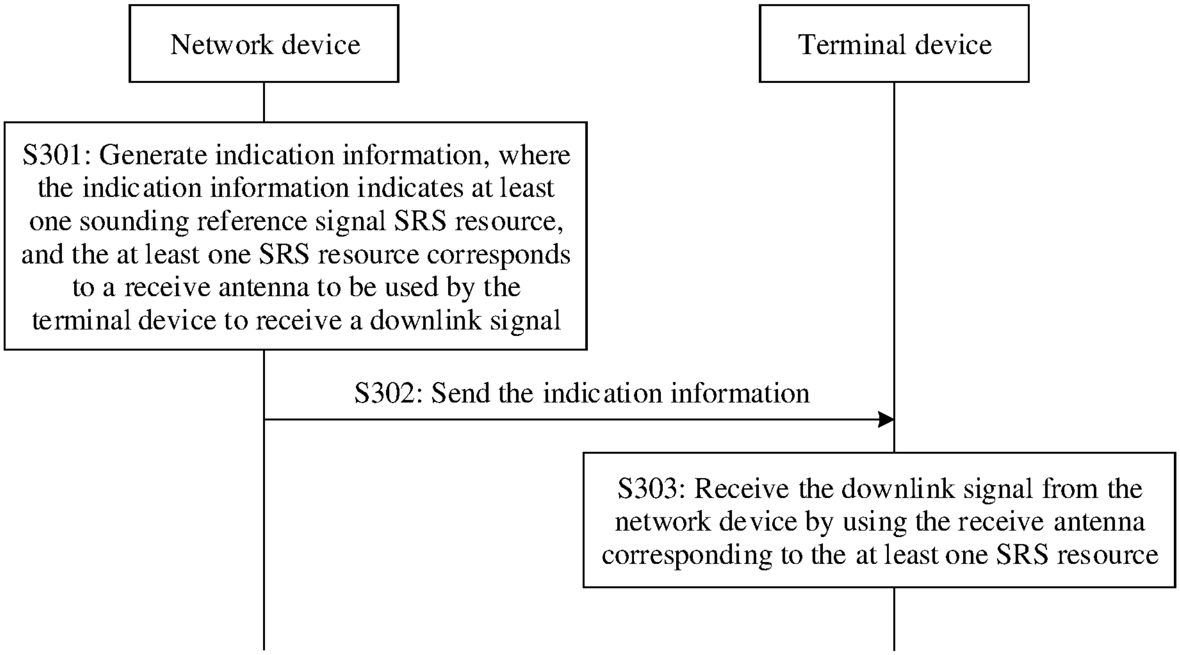
FIG. 3 is a flowchart of a signal receiving and sending method according to an embodiment of this disclosure.

As shown in FIG. 3, an embodiment of this disclosure provides a signal receiving and sending method. The method may be applied to the wireless communication system shown in FIG. 2. A procedure for the method is described as follows:

S301: A network device generates indication information, where the indication information indicates at least one sounding reference signal SRS resource, and the at least one SRS resource corresponds to a receive antenna to be used by a terminal device to receive a downlink signal.

S302: The network device sends the indication information to the terminal device, and the terminal device receives the indication information from the network device.

S303: The network device sends the downlink signal to the terminal device, and the terminal device receives the downlink signal from the network device by using the receive antenna corresponding to the at least one SRS resource.

In this embodiment of this disclosure, the receive antenna used by the terminal device to receive the downlink signal includes a receive antenna port and/or a receive beam. The receive antenna port and/or the receive beam are/is selected by the network device for the terminal device.

Details are as follows: (1) If ABF is performed on none of antenna ports of the terminal device, the network device selects only the receive antenna port for the terminal device. (2) If ABF can be performed on each antenna port of the terminal device in a beamforming manner, the network device may first select the receive antenna port for the terminal device, and then select the receive beam for the terminal device from a beam of the receive antenna port. (3) If ABF is performed on none of antenna ports of the terminal device (where for ease of description, the antenna port on which the ABF is not performed is referred to as a first antenna port), but can be performed on a combination of a plurality of antenna ports (where for ease of description, the combination of the plurality of antenna ports on which the ABF can be performed is referred to as a second antenna port herein), the network device may first select a first antenna port and/or a second antenna port for the terminal device. If a selection result includes the second antenna port, the network device further selects the receive beam for the terminal device from a beam of the second antenna port. (4) If ABF can be performed on a part of antenna ports of the terminal device, and is not performed on the other part of the antenna ports, the network device may first select, for the terminal device, a receive antenna port on which the ABF is performed and/or a receive antenna port on which the ABF is not performed, and then further select the receive beam for the terminal device from a beam of the receive antenna port on which the ABF is performed.

The following separately describes the four cases in detail.

Case 1: It is assumed that the ABF is performed on none of the antenna ports, and the network device selects the receive antenna port for the terminal device, and indicates the receive antenna port to the terminal device.

In this case, the network device may consider selection of only an antenna port rather than a beam.

(1) First, the network device configures a first SRS resource set (an SRS resource set #0) for the terminal device. There is an association relationship (or a correspondence) between an SRS resource in the SRS resource set #0 and an antenna port of the terminal device. For ease of description, the association relationship between an SRS resource in the SRS resource set #0 and an antenna port of the terminal device is referred to as a first association relationship herein.

It should be understood that the first association relationship means that there is a definite mapping relationship between an SRS resource in the SRS resource set #0 and an antenna port of the terminal device. Based on the mapping relationship, the network device and the terminal device may find a corresponding antenna port of the terminal device based on an SRS resource, and may also find a corresponding SRS resource based on an antenna port of the terminal device.

A possible first association relationship is: The SRS resource set #0 includes at least one first SRS resource, each first SRS resource includes at least one first SRS port, and each first SRS port is associated with one antenna port of the terminal device.

Optionally, a specific configuration of the SRS resource set #0 may be related to an antenna capability reported by the terminal device. The antenna capability includes a part or all of the following information: a quantity (T) of transmit antenna ports (namely, a quantity of radio frequency transmit channels), a quantity (R) of receive antenna ports (namely, a quantity of radio frequency receive channels), a total quantity (A) of antenna ports, or a quantity (B) of analog beams. It should be understood that the network device configures the SRS resource set #0 for the terminal device only when the terminal device reports a fact that $A>R$ (to be specific, when there is a requirement for switching a receive antenna port).

For example, the first association relationship may be:

an SRS resource #r0+i and an SRS port #j are associated with an antenna port #p0+i*T+j, where $i=0, 1, \ldots, \text{or } A/T-1$; $j=0, 1, \ldots, \text{or } T-1$; A is the total quantity of antenna ports, and T is the quantity of transmit antenna ports.

It can be learned from this that one antenna port may be uniquely identified by one first SRS resource and one first SRS port.

A specific example is used for description. It is assumed that the SRS resource set #0 includes four first SRS resources, each first SRS resource includes two first SRS ports (an SRS port #0 and an SRS port #1), each first SRS port is associated with one antenna port, and the first association relationship is: an SRS resource #r0+i and an SRS port #0 are associated with an antenna port #p0+2i, and an SRS port #1 is associated with an antenna port #p0+2i+1, where i=0, 1, . . . , or 3; r0 represents an initial ID of the first SRS resources in the SRS resource set #0, and p0 represents an initial ID of the antenna ports of the terminal device. Specifically, as shown in Table 1, it can be learned from Table 1 that one antenna port may be uniquely identified by one first SRS resource ID and one first SRS port ID.

TABLE 1

| SRS resource set #0 | | |
|---|---|---|
| First SRS resource ID | First SRS port ID | Antenna port ID |
| r0 + 0 | 0 | p0 + 0 |
| r0 + 0 | 1 | p0 + 1 |
| r0 + 1 | 0 | p0 + 2 |
| r0 + 1 | 1 | p0 + 3 |
| r0 + 2 | 0 | p0 + 4 |
| r0 + 2 | 1 | p0 + 5 |
| r0 + 3 | 0 | p0 + 6 |
| r0 + 3 | 1 | p0 + 7 |

(2) After the network device configures the SRS resource set #0 for the terminal device, the terminal device sends a first SRS on each antenna port. The network device tests receiving performance of each antenna port based on the first SRS, and uses a group of antenna ports (where a group of antenna ports includes one or more antenna ports) with optimal receiving performance as the receive antenna port of the terminal device.

Because there is the first association relationship between a first SRS resource in the SRS resource set #0 and an antenna port of the terminal device, the network device may receive the first SRS, to measure channel information of all the antenna ports (for example, an antenna port #p0 to an antenna port #p0+$^{7}$) of the terminal device, and select a group of antenna ports (for example, the antenna port #p0 and the antenna port #p0+1) with optimal receiving performance as the receive antenna port of the terminal device.

(3) The network device notifies the terminal device of the selected receive antenna port by using signaling (carrying the indication information). The terminal device receives the downlink signal from the network device on the receive antenna port selected by the network device for the terminal device.

Similarly, because there is the first association relationship between a first SRS resource in the SRS resource set #0 and an antenna port of the terminal device, the network device may indicate, to the terminal device, a first SRS resource associated with the receive antenna port (in other words, send the indication information). The terminal device determines, based on the first association relationship between a first SRS resource and an antenna port of the terminal device, the receive antenna port corresponding to the first SRS resource indicated by the network device, and then receives the downlink signal from the network device through the receive antenna port.

Table 1 is still used as an example. It is assumed that after the network device measures the channel information of all the antenna ports of the terminal device, the group of antenna ports with optimal performance includes the antenna port #p0 and the antenna port #p0+1. In this case, the network device may indicate a combination of the SRS resource #r0 and the SRS port #0 and a combination of the SRS resource #r0 and the SRS port #1 to the terminal device.

Case 2: It is assumed that the ABF is performed on all receive antennas, and the network device selects the receive beam for the terminal device, and indicates the receive beam to the terminal device.

In this embodiment of this disclosure, an ABF beam may be generated by a single antenna port, or may be generated by a combination of two or more antenna ports. The following separately describes a case in which a single antenna port generates an ABF beam.

Specifically, if one antenna port drives a plurality of antenna elements in a horizontal direction, ABF in the horizontal direction may be implemented, to be specific, the ABF beam may be generated by one antenna port.

Because the terminal device has a large quantity of antenna ports, to obtain better receiving performance and higher beam selection efficiency, the network device may first select a receive antenna port with excellent receiving performance for the terminal device (based on a first SRS resource set), and then select, for the terminal device (based on a second SRS resource set), a receive beam with excellent receiving performance from beams corresponding to these receive antenna ports.

(1) First, the network device configures the first SRS resource set (an SRS resource set #0) for the terminal device.

For a specific implementation of the part (1) in the case 2 herein, refer to the specific implementation, for example, Table 1, of the part (1) in the foregoing case 1. Details are not described herein again.

(2) After the network device configures the SRS resource set #0 for the terminal device, the terminal device sends a first SRS on each antenna port. The network device tests receiving performance of each antenna port based on the first SRS, and uses an antenna port whose receiving performance meets a preset condition as the receive antenna port of the terminal device.

(3) The network device configures the second SRS resource set (an SRS resource set #1) for the terminal device. There is an association relationship (or a correspondence) between an SRS resource in the SRS resource set #1 and both an antenna port of the terminal device and a beam generated by the antenna port. For ease of description, the association relationship between an SRS resource in the SRS resource set #1 and both an antenna port of the terminal device and a beam generated by the antenna port is referred to as a second association relationship herein.

It should be understood that the second association relationship means that there is a definite mapping relationship between an SRS resource in the SRS resource set #1 and both an allocated antenna port of the terminal device and a beam generated by the antenna port. Based on the mapping relationship, the network device and the terminal device may find a corresponding antenna port of the terminal device and a corresponding beam based on an SRS resource, and may also find a corresponding SRS resource based on an antenna port and a beam of the terminal device.

A possible second association relationship is: The SRS resource set #1 includes at least one second SRS resource, each second SRS resource includes at least one second SRS port, and each second SRS port is associated with one antenna port of the terminal device and one beam generated by the antenna port.

Optionally, a specific configuration of the SRS resource set #1 may be related to an antenna capability reported by the terminal device. The antenna capability includes a part or all of the following information: a quantity (T) of transmit antenna ports (namely, a quantity of radio frequency transmit channels), a quantity (R) of receive antenna ports (namely, a quantity of radio frequency receive channels), a total quantity (A) of antenna ports, or a quantity (B) of analog beams. It should be understood that the network device configures the SRS resource set #1 for the terminal device only when the terminal device reports a fact that B>1 (to be specific, when there is a requirement for switching a beam).

For example, the second association relationship may be:

an SRS resource #r1+i and an SRS port #j are associated with a beam #$\lfloor i/(A/T) \rfloor$ on an antenna port #p0+(i*T+j) % A, where i=0, 1, . . . , or A/T*B−1; j=0, 1, . . . , or T−1; A is the total quantity of antenna ports, T is the quantity of transmit antenna ports, B is the quantity of analog beams, % represents a modulo operation, and $\lfloor \square \rfloor$ represents a floor operation.

It can be learned from this that one beam generated on one antenna port may be uniquely identified by one second SRS resource and one second SRS port.

A specific example is used for description. It is assumed that the SRS resource set #1 includes eight second SRS resources, each second SRS resource includes two second SRS ports (an SRS port #0 and an SRS port #1), and each second SRS port is associated with one antenna port and one beam generated by the antenna port, as shown in Table 2.

TABLE 2

| SRS resource set #1 | | | |
|---|---|---|---|
| Second SRS resource ID | Second SRS port ID | Antenna port ID | Beam ID |
| r1 + 0 | 0 | p0 + 0 | 0 |
| r1 + 0 | 1 | p0 + 1 | 0 |
| r1 + 1 | 0 | p0 + 2 | 0 |
| r1 + 1 | 1 | p0 + 3 | 0 |
| r1 + 2 | 0 | p0 + 4 | 0 |
| r1 + 2 | 1 | p0 + 5 | 0 |
| r1 + 3 | 0 | p0 + 6 | 0 |
| r1 + 3 | 1 | p0 + 7 | 0 |
| r1 + 4 | 0 | p0 + 0 | 1 |
| r1 + 4 | 1 | p0 + 1 | 1 |
| r1 + 5 | 0 | p0 + 2 | 1 |
| r1 + 5 | 1 | p0 + 3 | 1 |
| r1 + 6 | 0 | p0 + 4 | 1 |
| r1 + 6 | 1 | p0 + 5 | 1 |
| r1 + 7 | 0 | p0 + 6 | 1 |
| r1 + 7 | 1 | p0 + 7 | 1 |

Optionally, the network device may configure the SRS resource set #1 while configuring the SRS resource set #0, or may configure the SRS resource set #1 for the terminal device after determining the receive antenna port. This is not specifically limited in this embodiment of this disclosure.

For example, the network device configures the SRS resource set #1 while configuring the SRS resource set #0. In this case, the SRS resources in the SRS resource set #1, for example, all the SRS resources in Table 2, may correspond to all the antenna ports of the terminal device, and a part of the SRS resources in the SRS resource set #1 are triggered. In this way, the terminal device only needs to send SRSs on different beams generated by the receive antenna port, so that a quantity of times of sending an SRS by the terminal device can be reduced.

For example, if the antenna port #p0+0 and the antenna port #p0+1 are selected, although the SRS resource set #1 includes the SRS resources #r1+0 to #r1+7, only the SRS resource #r1+1 and the SRS resource #r1+4 need to be triggered.

For example, the network device may configure the SRS resource set #1 for the terminal device based on the receive antenna port after determining the receive antenna port. In this case, the SRS resources in the SRS resource set #1 correspond only to a part of the antenna ports (namely, the receive antenna port) of the terminal device, and all the SRS resources in the SRS resource set #1 are triggered. In this way, the terminal device only needs to send SRSs on different beams generated by the receive antenna port, so that a quantity of times of sending an SRS by the terminal device can be reduced, and overheads for configuring the second SRS resource set by the network device can be effectively reduced.

For example, if the antenna port #p0+2 and the antenna port #p0+1 are selected, only the SRS resource #r1+1 and the SRS resource #r1+4 need to be configured in the SRS resource set #1, and are triggered.

(4) After the network device configures the SRS resource set #1 for the terminal device, the terminal device sends a second SRS on each beam of each antenna port, and the network device tests receiving performance of each beam on each antenna port based on the second SRS, and uses a group of beams with optimal receiving performance as the receive beam.

Because there is the second association relationship between a second SRS resource in the SRS resource set #1 and a beam generated by an antenna port of the terminal device, the network device may receive the second SRS, to measure channel information of beams on all the antenna ports of the terminal device, and select a group of beams (for example, the beam 0 on the antenna port #p0 and the beam 1 on the antenna port #p0+1) with optimal receiving performance as the receive beam of the terminal device.

It should be noted that during specific implementation, (1) and (2) may not be performed. To be specific, second SRS resources may be directly configured for all the antenna ports, all beams on all the antenna ports are measured based on the second SRS resources, and then a receive beam with optimal receiving performance is directly selected.

(5) Finally, the network device notifies the terminal device of the selected receive beam (and an antenna port on which the beam is located) by using signaling. The terminal device determines the receive beam (and the antenna port on which the beam is located) based on the signaling, and receives the downlink signal from the network device through the receive beam.

Similarly, because there is the second association relationship between a second SRS resource in the SRS resource set #1 and both an antenna port of the terminal device and a beam on the antenna port, the network device may indicate, to the terminal device, a second SRS resource associated with the receive beam (in other words, send the indication information), so that the terminal device determines the receive antenna port and the receive beam on the antenna port based on the second SRS resource indicated by the network device, and then receives the downlink signal from the network device through the receive beam on the antenna port.

Table 2 is still used as an example. It is assumed that after the network device measures the channel information of all the antenna ports of the terminal device, the group of beams with optimal performance includes the beam 0 on the antenna port #p0 and the beam 1 on the antenna port #p0+1. In this case, the network device may indicate a combination of the SRS resource #r1+0 and the SRS port #0 and a combination of the SRS resource #r1+4 and the SRS port #1 to the terminal device.

Figure 4:
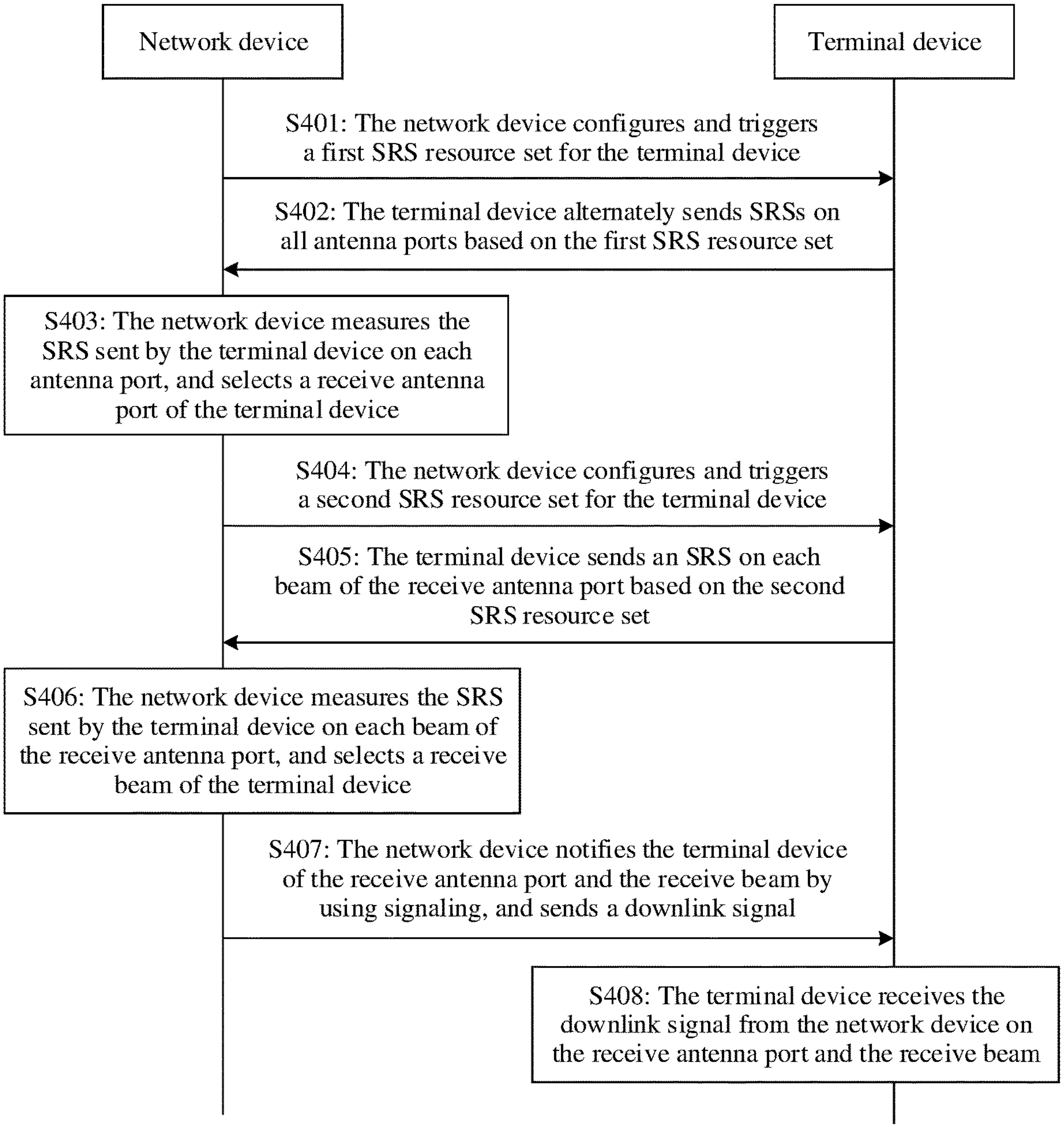
FIG. 4 is a flowchart of a method for selecting an antenna port and a beam according to an embodiment of this disclosure.

To more clearly understand the foregoing method for selecting an antenna port and a beam, the following uses a possible complete embodiment procedure as an example. Refer to FIG. 4. A method for selecting an antenna port and a beam specifically includes the following steps.

S401: The network device configures and triggers a first SRS resource set (an SRS resource set #0) for the terminal device.

S402: The terminal device alternately sends first SRSs on all the antenna ports based on the first SRS resource set.

To be specific, a physical resource used by the terminal device to send the first SRS is indicated by the first SRS resource set (the SRS resource set #0).

S403: The network device measures the first SRS from the terminal device on each antenna port, and selects a receive antenna port of the terminal device.

The network device receives the first SRS, measures channel information of all the antenna ports, and selects a group of antenna ports with optimal receiving performance as the receive antenna port of the terminal device. It should be understood that the group of antenna ports herein may include a plurality of antenna ports.

Optionally, after step S403 is performed, the network device may immediately notify the terminal device of the receive antenna port, or the network device may notify the terminal device of both the receive antenna port and a receive beam after selecting the receive beam for the terminal device.

The following uses an example in which the network device notifies the terminal device of both the receive antenna port and the receive beam after selecting the receive beam for the terminal device.

S404: The network device configures and triggers a second SRS resource set (an SRS resource set #1) for the terminal device.

S405: The terminal device sends a second SRS on each beam of the receive antenna port based on the second SRS resource set.

To be specific, a physical resource used by the terminal device to send the second SRS is indicated by the second SRS resource set (the SRS resource set #1).

S406: The network device measures the second SRS from the terminal device on each beam of the receive antenna port, and selects the receive beam of the terminal device.

The network device receives the second SRS, measures channel information of all the beams of the receive antenna port, and selects a group of beams with optimal receiving performance as the receive beam of the terminal device. It should be understood that the group of beams herein may include one or more beams.

S407: The network device notifies the terminal device of the receive antenna port and the receive beam by using signaling, and sends a downlink signal.

S408: The terminal device receives the downlink signal from the network device through the receive antenna port and the receive beam.

Case 3: If the ABF is performed on none of the antenna ports of the terminal device (where for ease of description, the antenna port on which the ABF is not performed is referred to as the first antenna port), but can be performed on the combination of the plurality of antenna ports (where for ease of description, the combination of the plurality of antenna ports on which the ABF can be performed is referred to as the second antenna port herein), the network device may first select the receive antenna port for the terminal device from the first antenna port and/or the second antenna port. If the receive antenna port selection result includes an antenna port in the second antenna port, the receive beam is further selected for the terminal device from the beam of the second antenna port.

Specifically, beam sweeping in a horizontal direction is used as an example. One antenna port drives only one antenna element in the horizontal direction, but a plurality of antenna ports may drive a plurality of antenna elements in the horizontal direction after being combined. In this case, an ABF beam is generated by two or more antenna ports.

Because the terminal device has a plurality of antennas, the terminal device may also have a plurality of antenna port combinations that can generate an ABF beam.

For example, it is assumed that the terminal device has a total of eight physical antenna ports: an antenna port #p0 to an antenna port #p7. For example, two actual physical antenna ports may generate an ABF beam after being combined. In this case, the two actual physical antenna ports may be referred to as one antenna port group on which the ABF is performed. As shown in Table 3, it is assumed that there are four antenna port groups on which ABF can be performed: an antenna port group, namely, an antenna port #p1+0, including the antenna port #p0+0 and the antenna port #p0+1, an antenna port group, namely, an antenna port #p1+1, including the antenna port #p0+2 and the antenna port #p0+3, an antenna port group, namely, an antenna port #p1+2, including the antenna port #p0+4 and the antenna port #p0+5, and an antenna port group, namely, an antenna port #p1+3, including the antenna port #p0+6 and the antenna port #p0+7.

TABLE 3

Correspondence between a first antenna port and a second antenna port

| First SRS resource ID | First SRS port ID | First antenna port ID | Second antenna port ID |
|---|---|---|---|
| r0 + 0 | 0 | p0 + 0 | p1 + 0 |
| r0 + 0 | 1 | p0 + 1 | |
| r0 + 1 | 0 | p0 + 2 | p1 + 1 |
| r0 + 1 | 1 | p0 + 3 | |
| r0 + 2 | 0 | p0 + 4 | p1 + 2 |
| r0 + 2 | 1 | p0 + 5 | |
| r0 + 3 | 0 | p0 + 6 | p1 + 3 |
| r0 + 3 | 1 | p0 + 7 | |

It should be understood that each second antenna port in Table 3 actually corresponds to two actual physical antenna ports (namely, first antenna ports). The second antenna port ID (for example, p1+0 and p1+1) herein is merely a name for easily describing a group of antenna ports that can generate a corresponding ABF beam. During actual application, an ID of each antenna port corresponding to ABF may alternatively be directly used to describe the second antenna port. For example, the antenna port #p1+0 may also be expressed as the antenna port #p0+0 and the antenna port #p0+1, and the antenna port #p1+1 may also be expressed as the antenna port #p0+2 and the antenna port #p0+3. Certainly, there may also be another expression manner to describe a combination of a plurality of antenna ports. This is not limited herein.

To obtain better receiving performance and higher beam selection efficiency, the network device may first select a receive antenna port group with excellent receiving performance for the terminal device, and then select, for the terminal device, the receive beam with excellent receiving performance from beams corresponding to these receive antenna port groups. Specifically, the following steps are included.

(1) First, the network device configures a first SRS resource set (an SRS resource set #0) for the terminal device.

For a specific implementation of the part (1) in the case 3 herein, refer to the specific implementation, for example, Table 1, of the part (1) in the foregoing case 1. Details are not described herein again.

(2) After the network device configures the SRS resource set #0 for the terminal device, the terminal device sends a first SRS on each antenna port. The network device tests receiving performance of each antenna port based on the first SRS, and uses an antenna port whose receiving performance meets a preset condition as the receive antenna port of the terminal device.

After testing the receiving performance of each antenna port based on the first SRS, the network device selects an antenna port with excellent receiving performance from Table 3. Types of these antenna ports may include only the first antenna port, only the second antenna port, or both the first antenna port and the second antenna port.

If only the first antenna port is included, the network device may directly notify the terminal device of the selected first antenna port (where the first antenna port selected by the network device is referred to as a first receive antenna port herein). The terminal device determines the first receive antenna port based on a first SRS resource indicated by the network device, and receives the downlink signal from the network device through the first receive antenna port. For a specific implementation, refer to the part (3) in the foregoing case 1.

If only the second antenna port is included, or both the first antenna port and the second antenna port are included, the network device performs the following (3) to (5).

(3) The network device configures a second SRS resource set (an SRS resource set #1) for (the second antenna port of) the terminal device. There is an association relationship (or a correspondence) between an SRS resource in the SRS resource set #1 and both a second antenna port of the terminal device and a beam on the second antenna port. For ease of description, the association relationship between an SRS resource in the SRS resource set #1 and both a second antenna port of the terminal device and a beam on the second antenna port is referred to as a second association relationship herein. It should be understood that, unless otherwise specified, a beam in this specification is an ABF beam.

The second association relationship means that there is a definite mapping relationship between an SRS resource in the SRS resource set #1 and both an allocated second antenna port and a beam of the terminal device. Based on the mapping relationship, the network device and the terminal device may find a corresponding second antenna port of the terminal device and a beam on the second antenna port based on an SRS resource, and may also find a corresponding SRS resource based on a second antenna port of the terminal device and a beam on the second antenna port.

In a possible association manner, the SRS resource set #1 includes at least one second SRS resource, each second SRS resource includes at least one second SRS port, and each second SRS port is associated with at least two actual physical antenna ports.

In a possible implementation of this embodiment of this disclosure, the SRS resource set #1 may not be directly associated with the physical antenna port of the terminal device, but a third association relationship may be established between the SRS resource set #0 and the SRS resource set #1, and then the SRS resource set #1 is indirectly associated with the actual physical antenna port of the terminal device by using the third association relationship and the SRS resource set #0.

For example, the third association relationship includes: One second SRS port corresponds to a plurality of first SRS ports, and different spatial relationship information (SpatialRelationInfo) is configured for second SRS resources to which a plurality of second SRS ports corresponding to a same first SRS port belong. The spatial relationship information indirectly indicates beam information, for example, a filter coefficient used by the terminal device to receive a signal. Because one second SRS port corresponds to a plurality of first SRS ports, and one first SRS port is associated with one actual physical antenna port, one second SRS port is indirectly associated with a plurality of physical antenna ports.

Similarly, a specific configuration of the SRS resource set #1 herein is related to an antenna capability reported by the terminal device. It should be understood that the network device configures the SRS resource set #1 for the terminal device only when the terminal device reports a fact that B>1 (to be specific, when there is a requirement for selecting a beam).

For example, a first association relationship is:

an SRS resource #r0+i and an SRS port #j are associated with an antenna port #p0+i*T+j, where i=0, 1, . . . , or A/T−1; j=0, 1, . . . , or T−1; A is a quantity of actual antenna ports of the terminal device (namely, a total quantity of first antenna ports), and T is a quantity of radio frequency transmit channels.

The second association relationship is:

an SRS resource #r1+i' and an SRS port #j' are associated with an antenna port #p0+(i'*T+j')% A' and a beam #⌊i'/(A'/T)⌋, where i'=0, 1, . . . , or A'/T*B−1; j'=0, 1, . . . , or T−1; it should be understood that A' is different from A, A is the total quantity of first antenna ports, A' is a total quantity of second antenna ports, and T is the quantity of radio frequency transmit channels.

The third association relationship is:

an SRS resource #r1+i" and an SRS port #j" are associated with an SRS resource #r0+(i"*T+j")% A' and an SRS port #k, where k={0, 1, . . . , T−1}; i"=0, 1, . . . , or A'/T*B−1; j"=0, 1, . . . , or T−1.

It can be learned from the foregoing that one beam on one second antenna port (namely, one group of antenna ports that can be combined to generate an ABF beam) may be uniquely identified by one second SRS resource and one second SRS port.

A specific example is used for description. It is assumed that the SRS resource set #1 includes four second SRS resources, and each second SRS resource includes two second SRS ports (an SRS port #0' and an SRS port #1'). In this case, a configuration of the SRS resource set #1 may be that shown in Table 4. With reference to Table 4 and Table 3, the third association relationship between the SRS resource set #1 and the SRS resource set #0 may be that shown in Table 5.

TABLE 4

| SRS resource set #1 | | | |
|---|---|---|---|
| Second SRS resource ID | Second SRS port ID | Antenna port ID | Beam ID |
| r1 + 0 | 0' | p1 + 0 (namely, p0 + 0 and p0 + 1) | 0 |
| r1 + 0 | 1' | p1 + 1 (namely, p0 + 2 and p0 + 3) | 0 |

TABLE 4-continued

| SRS resource set #1 | | | |
|---|---|---|---|
| Second SRS resource ID | Second SRS port ID | Antenna port ID | Beam ID |
| r1 + 1 | 0' | p1 + 2 (namely, p0 + 4 and p0 + 5) | 0 |
| r1 + 1 | 1' | p1 + 3 (namely, p0 + 6 and p0 + 7) | 0 |
| r1 + 2 | 0' | p1 + 0 (namely, p0 + 0 and p0 + 1) | 1 |
| r1 + 2 | 1' | p1 + 1 (namely, p0 + 2 and p0 + 3) | 1 |
| r1 + 3 | 0' | p1 + 2 (namely, p0 + 4 and p0 + 5) | 1 |
| r1 + 3 | 1' | p1 + 3 (namely, p0 + 6 and p0 + 7) | 1 |

TABLE 5

Third association relationship between an SRS resource set #1 and an SRS resource set #0

| First SRS resource ID | First SRS port ID | First antenna port ID | Second antenna port ID | Second SRS resource ID | Second SRS port ID | Beam ID |
|---|---|---|---|---|---|---|
| r0 + 0 | 0 | p0 + 0 | p1 + 0 | r1 + 0 | 0' | 0 |
| r0 + 0 | 1 | p0 + 1 | | r1 + 2 | 0' | 1 |
| r0 + 1 | 0 | p0 + 2 | p1 + 1 | r1 + 0 | 1' | 0 |
| r0 + 1 | 1 | p0 + 3 | | r1 + 2 | 1' | 1 |
| r0 + 2 | 0 | p0 + 4 | p1 + 2 | r1 + 1 | 0' | 0 |
| r0 + 2 | 1 | p0 + 5 | | r1 + 3 | 0' | 1 |
| r0 + 3 | 0 | p0 + 6 | p1 + 3 | r1 + 1 | 1' | 0 |
| r0 + 3 | 1 | p0 + 7 | | r1 + 3 | 1' | 1 |

Optionally, the network device may configure the SRS resource set #1 while configuring the SRS resource set #0, or may configure the SRS resource set #1 for the terminal device after selecting the receive antenna port. This is not specifically limited in this embodiment of this disclosure.

For example, the network device configures the SRS resource set #1 while configuring the SRS resource set #0. In this case, the SRS resources in the SRS resource set #1, for example, all the SRS resources in Table 4, may correspond to all the second antenna ports (namely, all antenna port groups that can generate ABF) of the terminal device, and a part of the SRS resources in the SRS resource set #1 are triggered. In this way, the terminal device only needs to send SRSs on different beams generated by the receive antenna port, so that a quantity of times of sending an SRS by the terminal device can be reduced.

For example, as shown in Table 4, if the network device selects the antenna port #p1+2 and the antenna port #p1+3, although the SRS resource set #1 includes the SRS resource #r1+0, the SRS resource #r1+1, the SRS resource #r1+2, and the SRS resource #r1+3, only the SRS resource #r1+1 and the SRS resource #r1+3 need to be triggered.

For example, the network device may configure the SRS resource set #1 for the terminal device based on the selected receive antenna port after selecting the receive antenna port. In this case, the SRS resources in the SRS resource set #1 correspond only to a part of the second antenna ports of the terminal device (namely, a part of antenna port groups that can generate ABF), and all the SRS resources in the SRS resource set #1 are triggered. In this way, overheads of configuring the second SRS resource set by the network device can be effectively reduced.

For example, as shown in Table 4, if the network device selects the antenna port #p1+2 and the antenna port #p1+3, the SRS resource set #1 needs to include only the SRS resource #r1+1 and the SRS resource #r1+3, and the SRS resource #r1+1 and the SRS resource #r1+3 are triggered.

(4) After the network device configures the SRS resource set #1 for the terminal device, the terminal device sends a second SRS on each beam of the second antenna port. The network device tests receiving performance of each beam on each second antenna port based on the second SRS, and uses a group of beams (including one or more beams) with optimal receiving performance as the receive beam of the terminal device, where a second antenna port on which the receive beam is located is a second receive antenna port.

Similarly, because there is the second association relationship between a second SRS resource in the SRS resource set #1 and both a second antenna port of the terminal device and a beam on the second antenna port, the network device may receive the second SRS, measure channel information of the beam on each second antenna port of the terminal device, select the group of beams with optimal receiving performance as the receive beam of the terminal device, and use the second antenna port on which the receive beam is located as the second receive antenna port.

It should be understood that beam selection herein is considered from a perspective of receiving performance of a beam. Therefore, only a part or all of beams on each second receive antenna port may be selected as the receive beam. This is not limited herein.

(5) Finally, the network device notifies the terminal device of the selected second receive antenna port and the selected receive beam by using signaling, and the terminal device receives the downlink signal from the network device on the second receive antenna port and the receive beam.

Similarly, because there is the second association relationship between an second SRS resource in the SRS resource set #1 and both a second antenna port and a beam of the terminal device, the network device may indicate an SRS resource associated with both the second receive antenna port and the receive beam to the terminal device. The terminal device finds, based on the second association relationship, the corresponding receive beam and second receive antenna port, finds, based on the third association relationship and the first association relationship, an actual physical antenna port corresponding to the second receive antenna port, and then receives the downlink signal from the network device through the second receive antenna port and the receive beam.

For example, assuming that a group of beams finally selected by the network device is the beam #0 generated by the antenna port #p1+0, based on Table 4, the indication information may include the SRS resource #r1+0 and the SRS port #0'. After receiving the indication information (the SRS resource #r1+0 and the SRS port #0'), the terminal device may find, based on the third association relationship (refer to Table 5), the SRS resource #r0+0, the SRS port #0, the SRS resource #r0+0, and the SRS port #1 that correspond to the SRS resource #r1+0 and the SRS port #0', and then determine, based on the first association relationship (refer to Table 3 or Table 5), the actual physical antenna ports, namely, the antenna port #p0+0 and the antenna port #p0+1, that correspond to the SRS resource #r0+0, the SRS port #0, the SRS resource #r0+0, and the SRS port #1 (in other words, correspond to the antenna port #p1+0). Then, the terminal device receives the downlink signal from the network device on the antenna port #p0+0 and the antenna port #p0+1 based on spatial relationship information (where the spatial relationship information may be for determining the beam #0) configured for the SRS resource #r1+0.

During actual application, the foregoing cases may alternatively be combined with each other for implementation.

For example, the case 1 and the case 2 may be combined with each other to implement the following case 4.

Case 4: If the ABF can be performed on a part of the antenna ports of the terminal device (where for example, the ABF can be performed on each of M antenna ports), and is not performed on the other part of the antenna ports (where for example, the ABF is performed on none of N antenna ports), the network device may first select receive antenna ports (which may include an antenna port in the M receive antennas, or may include an antenna port in the N receive antennas) for the terminal device. If the ABF is performed on none of the selected receive antenna ports, the receive antenna ports are directly notified to the terminal device. If the selected receive antenna ports still include an antenna port on which the ABF is performed, a beam may be further selected for the terminal device.

(1) First, the network device configures a first SRS resource set (an SRS resource set #0) and the SRS resource set #1 for the terminal device.

For details herein, refer to the related part in the foregoing case 1. The details are not described herein again.

(2) After the network device configures the SRS resource set #0 for the terminal device, the terminal device sends a first SRS on each antenna port. The network device tests receiving performance of each antenna port based on the first SRS, and selects a receive antenna port on which the ABF is not performed and a receive antenna port on which the ABF is performed.

It is assumed that the terminal device has a total of eight physical antenna ports, namely, an antenna port #p0 to an antenna port #p7, ABF can be performed on none of the antenna port #p0 to the antenna port #p3, and can be performed on each of the antenna port #p4 to the antenna port #p7, and antenna ports selected by the terminal device include the antenna port #p0 and the antenna port #p1 on which the ABF cannot be performed and the antenna port #p6 and the antenna port #p7 on which the ABF can be performed.

(3) The network device configures a second SRS resource set for the receive antenna port on which the ABF is performed, and there is a definite association relationship between an SRS resource in the SRS resource set #1 and a beam (on the antenna port on which the ABF can be performed and the antenna port on which the ABF can be performed) of the terminal device.

Still using the example in which the antenna ports selected by the terminal device are the antenna port #p0, the antenna port #p1, the antenna port #p6, and the antenna port #p7, the network device may configure the second SRS resource set for the selected receive antenna ports on which the ABF is performed, namely, the antenna port #p6 and the antenna port #p7, or configure the second SRS resource set for all the receive antenna ports on which the ABF can be performed, namely, the antenna port #p4 to the antenna port #p7. For a specific implementation of the content in this part, refer to the related part in the foregoing case 2.

(4) After the network device configures the SRS resource set #1 for the terminal device, the terminal device sends a second SRS on each beam of the receive antenna port on which the ABF is performed. The network device tests receiving performance of each beam based on the second SRS, and uses a group of beams with optimal receiving performance as the receive beam of the terminal device.

For example, the network device selects a beam #0 on the antenna port #p6 and a beam #1 on the antenna port #p7.

(5) Finally, the network device notifies the terminal device of the selected receive antenna port and the selected receive beam by using signaling, and the terminal device receives the downlink signal from the network device on the receive antenna port and the receive beam that are selected by the network device.

For example, the network device notifies the terminal device of the selected antenna port #p0 and antenna port #p1 on which the ABF cannot be performed, the beam #0 on the antenna port #p6, and the beam #1 on the antenna port #p7. The terminal device receives the downlink signal on the antenna port #p0, the antenna port #p1, the beam #0 on the antenna port #p6, and the beam #1 on the antenna port #p7 that are selected by the network device.

The foregoing describes a specific implementation in which the network device configures the SRS resource set for the terminal device, and selects the receive antenna port and/or the receive beam for the terminal device based on the SRS resource set. The following describes a specific implementation in which the network device indicates the antenna port and/or the receive beam to the terminal device after determining the antenna port and/or the receive beam.

Manner 1: The signaling (namely, the indication information) carries SRS resource information.

For example, the signaling includes an SRS resource ID and an SRS port ID. Based on the association relationship between an SRS resource and an antenna port and/or a beam, the SRS resource ID and the SRS port ID jointly indicate the receive antenna port and/or the receive beam.

Optionally, the signaling may be carried by a semi-persistent SRS activation/deactivation (SP SRS Activation/Deactivation) media access control control element (MAC CE).

Figure 5:
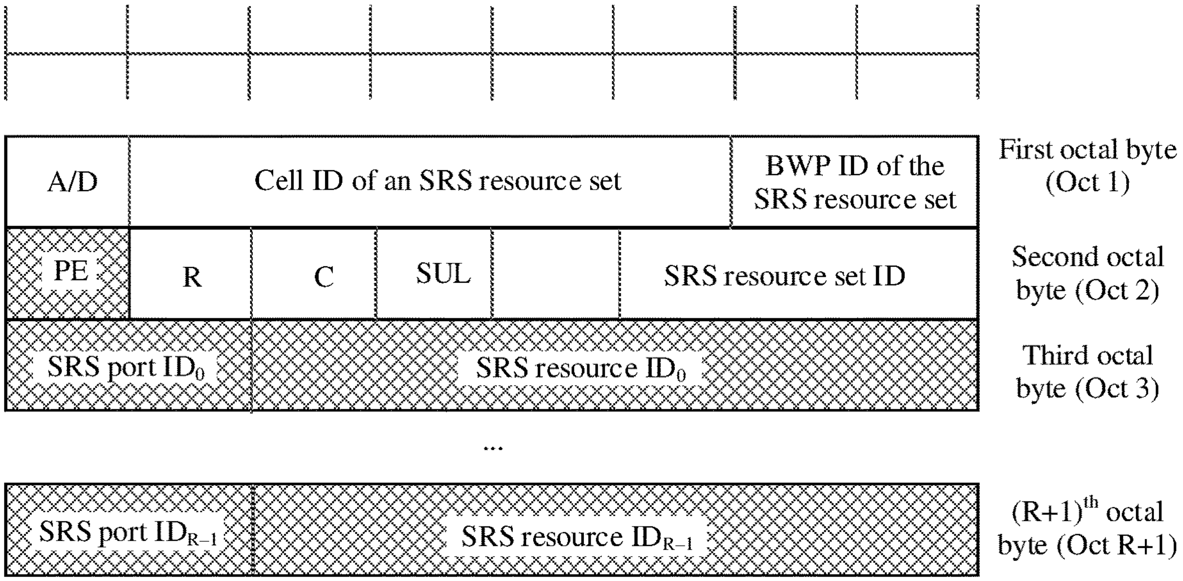
FIG. 5 is a schematic diagram of a signaling format according to an embodiment of this disclosure.

A signaling format may be that shown in FIG. 5. In FIG. 5, an unshaded part is an existing field of the MAC CE, and a shaded part is a newly added or modified field. Specific definitions of the fields are as follows:

- PE: which occupies one bit. When a value of PE is “1”, the MAC CE is for enabling the receive antenna port and/or the receive beam of the terminal device. When a value of PE is “0”, the MAC CE is for semi-persistent SRS activation/deactivation.
- SRS Resource IDm: which occupies one bit, and is an ID of the SRS resource associated with the receive antenna port and/or the receive beam.
- SRS Port IDm: which occupies two bits, and is an ID of an SRS port associated with the receive antenna port.

Manner 2: The signaling (namely, the indication information) carries index information of the receive antenna port and/or the receive beam.

In a possible design, the index information may be specifically an index value of the antenna port and/or an index value of the receive beam.

Figure 6:
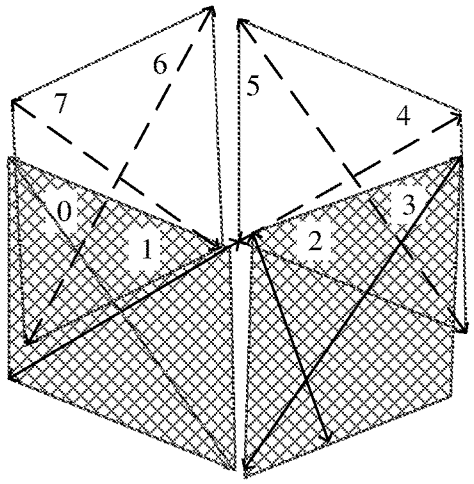
FIG. 6 is a schematic diagram of an antenna panel according to an embodiment of this disclosure.

An index of the receive antenna port is used as an example. As shown in FIG. 6, it is assumed that the terminal device has four panels, each panel has two antenna ports, and none of the antenna ports generates an ABF beam. Table 6 is an example of a possible receive antenna port combination subset, and lists 10 possible receive antenna port combinations. It should be understood that there are actually more than 10 antenna port combination manners listed in Table 6. Table 6 lists a plurality of groups of antenna ports whose receiving performance can meet the preset condition with a high probability. When selecting the receive antenna port for the terminal device, the network device selects only one antenna port combination with optimal performance from Table 6. In this way, a calculation rate can be improved.

TABLE 6

| Receive antenna port combination subset | |
|---|---|
| Combination index (Combination Index) | Antenna port ID |
| 0 | 0 1 2 3 |
| 1 | 2 3 4 5 |
| 2 | 4 5 6 7 |
| 3 | 0 1 6 7 |
| 4 | 0 3 5 6 |
| 5 | 1 2 4 7 |
| 6 | 0 1 2 7 |
| 7 | 1 2 3 4 |
| 8 | 2 4 5 7 |
| 9 | 1 4 6 7 |

In the second to the fifth rows of Table 6, assuming that a signal is propagated on a line of sight (line of sight, LOS), there is a high probability that antenna ports with optimal receiving performance are concentrated on two adjacent panels of the terminal device. In the sixth and the seventh rows of Table 6, assuming that a signal is propagated on a non-line of sight (line of sight, NLOS), there is a high probability that antenna ports with optimal receiving performance are evenly distributed on all the panels of the terminal device. In the eighth to the eleventh rows of Table 6, assuming that one panel of the terminal device is blocked, there is a high probability that antenna ports with optimal receiving performance are concentrated on a panel opposite to the blocked panel, and a small part of antenna ports with optimal receiving performance are distributed on another panel.

It should be understood that the receive antenna port combination subset is related to the antenna capability reported by the terminal device.

In addition, if a beam needs to be selected for the terminal device, a row to which each index belongs may further include an ID of a beam. Examples are not enumerated herein in detail for description.

Optionally, in this embodiment of this disclosure, a plurality of receive antenna port/receive beam combination subsets may be designed in advance based on different antenna capabilities. When selecting the receive antenna port/receive beam for the terminal device, the network device selects the receive antenna port/receive beam for the terminal device from a receive antenna port/receive beam combination subset corresponding to the antenna capability of the terminal device.

In another possible design, based on the association relationship between an antenna port and/or a beam and an SRS resource, the index information may alternatively be an index value of a combination including an SRS resource ID and an SRS port ID of the SRS resource corresponding to the antenna port and/or the receive beam.

For example, the indication information is specifically an index value, of the combination of the SRS resource ID and the SRS port ID of the SRS resource corresponding to the receive antenna port of the receive antenna port and/or the receive beam, in a receive antenna port/receive beam combination subset (referred to as a first subset herein for ease of description). The first subset includes an SRS resource ID and an SRS port ID of an SRS resource corresponding to each of a plurality of receive antenna combinations, and an index value of a combination of the SRS resource ID and the SRS port ID of the SRS resource corresponding to each receive antenna combination, where the index value of the combination of the SRS resource ID and the SRS port ID of the SRS resource corresponding to each receive antenna combination is unique in the first subset. For example, as shown in Table 7:

TABLE 7

| First subset | | | | | | | | | | | | | | | | |
|---|---|---|---|---|---|---|---|---|---|---|---|---|---|---|---|---|
| Combination index | SRS resource ID | SRS port ID | Antenna port ID | Beam ID | SRS resource ID | SRS port ID | Antenna port ID | Beam ID | SRS resource ID | SRS port ID | Antenna port ID | Beam ID | SRS resource ID | SRS port ID | Antenna port ID | Beam ID |
| 0 | r0 + 0 | 0 | p0 + 0 | — | r0 + 0 | 1 | p0 + 1 | — | r0 + 1 | 0 | p0 + 2 | — | r0 + 1 | 1 | p0 + 3 | — |
| 1 | r0 + 1 | 0 | p0 + 2 | — | r0 + 1 | 1 | p0 + 3 | — | r0 + 2 | 0 | p0 + 4 | — | r0 + 2 | 1 | p0 + 5 | — |
| 2 | r0 + 2 | 0 | p0 + 4 | — | r0 + 2 | 1 | p0 + 5 | — | r0 + 3 | 0 | p0 + 6 | — | r0 + 3 | 1 | p0 + 7 | — |
| 3 | r0 + 0 | 0 | p0 + 0 | — | r0 + 0 | 1 | p0 + 1 | — | r0 + 3 | 0 | p0 + 6 | — | r0 + 3 | 1 | p0 + 7 | — |
| 4 | r1 + 0 | 0 | p0 + 0 & p0 + 1 | 0 | r1 + 0 | 1 | p0 + 2 & p0 + 3 | 0 | r1 + 1 | 0 | p0 + 4 & p0 + 5 | 0 | r1 + 1 | 1 | p0 + 6 & p0 + 7 | 0 |
| 5 | r1 + 2 | 0 | p0 + 0 & p0 + 1 | 1 | r1 + 2 | 1 | p0 + 2 & p0 + 3 | 1 | r1 + 3 | 0 | p0 + 4 & p0 + 5 | 1 | r1 + 3 | 1 | p0 + 6 & p0 + 7 | 1 |
| 6 | r1 + 0 | 0 | p0 + 0 & p0 + 1 | 0 | r1 + 2 | 1 | p0 + 2 & p0 + 3 | 1 | r1 + 1 | 0 | p0 + 4 & p0 + 5 | 0 | r1 + 3 | 1 | p0 + 6 & p0 + 7 | 1 |
| 7 | r1 + 2 | 0 | p0 + 0 & p0 + 1 | 1 | r1 + 0 | 1 | p0 + 2 & p0 + 3 | 0 | r1 + 3 | 0 | p0 + 4 & p0 + 5 | 1 | r1 + 1 | 1 | p0 + 6 & p0 + 7 | 0 |

Certainly, actually, there are more than eight antenna port and/or beam combination manners listed in Table 7. Table 7 may be a proper subset of a universal set including all possible antenna port and/or beam combinations of the terminal device. Table 7 lists a set of antenna port and/or beam combinations whose receiving performance can meet the preset condition with a high probability. When selecting the receive antenna port and/or the receive beam for the terminal device, the network device selects an antenna port and/or beam combination with optimal performance from Table 7. In this way, a calculation rate can be improved.

Similarly, terminal devices with different antenna capabilities may correspond to different first subsets. Therefore, before the terminal device receives the indication information from the network device, the terminal device may further send antenna information of the terminal device to the network device, so that the network device determines the first subset based on the antenna information of the terminal device, and selects the receive antenna port and/or the receive beam for the terminal device from the first subset.

Similarly, in the manner 2, the signaling (the index information) may be carried by a MAC CE or downlink control information (DCI).

Figure 7A:
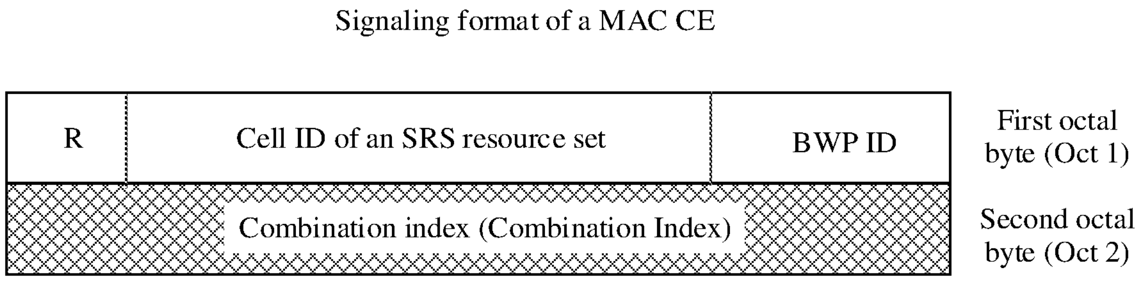
FIG. 7A is a schematic diagram of a signaling format of a MAC CE according to an embodiment of this disclosure.
Figure 7B:
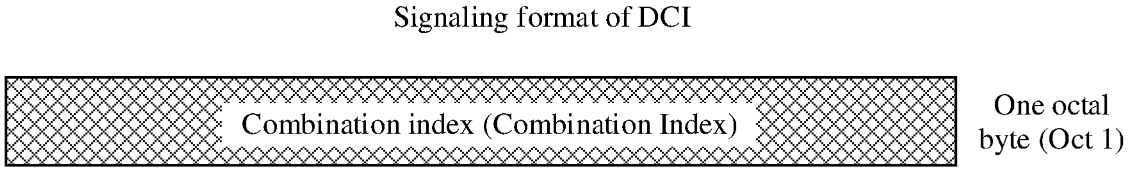
FIG. 7B is a schematic diagram of a signaling format of DCI according to an embodiment of this disclosure.

For example, FIG. 7A shows a format of a MAC CE carrying signaling, where a combination index occupies eight bits, and represents an index of the receive antenna port and/or the receive beam in the receive antenna port/receive beam combination subset. For example, FIG. 7B shows a format of DCI carrying signaling, where a combination index occupies eight bits, and represents an index of the receive antenna port and/or the receive beam in the receive antenna port/receive beam combination subset.

It can be learned from the foregoing that, in this embodiment of this disclosure, based on correlation or reciprocity between an uplink channel and a downlink channel, the network device receives the uplink SRS from the terminal device, and tests the receiving performance of each antenna port and/or beam of the terminal device, so that the network device selects the receive antenna port and/or the beam for the terminal device. Therefore, for the terminal device, measurement of all downlink channel information can be completed by switching only a transmit antenna port to send an SRS. This can avoid problems in a conventional technology that are caused by switching the receive antenna port by the terminal device, such as a failure to receive a downlink signal within a switching time period and deterioration of receiving performance induced after the switching, to improve downlink spectral efficiency. In addition, because uplink sending can be controlled by the terminal device, when switching the transmit antenna port and/or a transmit beam, the terminal device can avoid impact on other uplink sending, in other words, can ensure sending performance of the terminal device.

In addition, in this embodiment of this disclosure, there is a definite association relationship (for example, the first association relationship, the second association relationship, and the third association relationship above) between an SRS resource configured by the network device for the terminal device and an antenna port and/or a beam of the terminal device, so that the network device can select the receive antenna port and/or the receive beam for the terminal device based on these association relationships, and notify the terminal device of information about the receive antenna port and/or the receive beam based on these association relationships by using the signaling carrying the SRS resource information.

Furthermore, in this embodiment of this disclosure, the network device notifies the terminal device of the information about the selected receive antenna port and/or receive beam by using the signaling. There are two designs of the signaling: In a first design, the signaling carries the SRS resource information for the receive antenna port and/or the receive beam. In a second design, the signaling carries the index information of the receive antenna port and/or the receive beam (or the index information of the SRS resource corresponding to the receive antenna port and/or the receive beam). In the first signaling design, a small change is made to a protocol, and performance of the receive antenna port and/or the receive beam selected by the network device is excellent. In the second signaling design, overheads are low, and calculation complexity of selecting the receive antenna port and/or the receive beam by the network device is low.

It should be understood that the foregoing implementations in embodiments of this disclosure may be combined with each other to achieve different technical effects.

The foregoing describes the methods in embodiments of this disclosure with reference to the accompanying drawings. The following describes, with reference to the accompanying drawings, apparatuses in embodiments of this disclosure that are configured to implement the foregoing methods.

Figure 8:
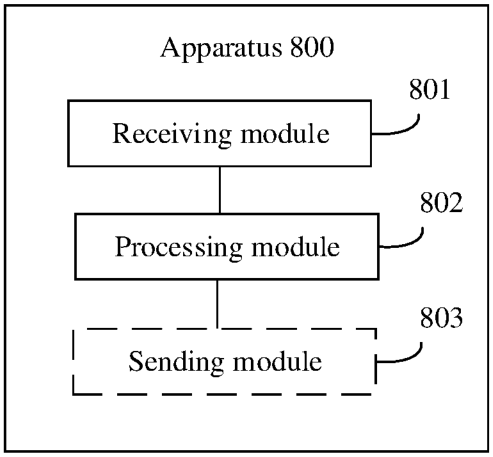
FIG. 8 is a schematic diagram of a structure of a signal receiving apparatus 800 according to an embodiment of this disclosure.

Refer to FIG. 8. Based on a same technical concept, an embodiment of this disclosure provides a signal receiving apparatus 800. The apparatus 800 may be a terminal device or an apparatus 800 on the terminal device. The apparatus 800 includes modules configured to perform the method in FIG. 3 or FIG. 4.

For example, the apparatus 800 may include:

a receiving module 801, configured to receive indication information from a network device, where the indication information indicates at least one sounding reference signal SRS resource, and the at least one SRS resource corresponds to a receive antenna to be used by the apparatus 800 to receive a downlink signal; and a processing module 802, configured to control the receiving module 801 to receive the downlink signal from the network device by using the receive antenna corresponding to the at least one SRS resource.

In a possible implementation, that the at least one SRS resource corresponds to a receive antenna to be used by the apparatus 800 to receive a downlink signal may include:

The at least one SRS resource includes at least one first SRS resource and at least one second SRS resource, where each of the at least one first SRS resource includes at least one first SRS port, and each first SRS port is associated with one antenna port; and each of the at least one second SRS resource includes at least one second SRS port, and each second SRS port is associated with at least two antenna ports.

In a possible implementation, the processing module 802 is specifically configured to:

determine a first receive antenna port based on the first SRS resource in the at least one SRS resource, and determine a second receive antenna port and a receive beam based on the second SRS resource in the at least one SRS resource; and control the receiving module 801 to receive the downlink signal from the network device by using the determined first receive antenna port, second receive antenna port, and receive beam.

In a possible implementation, that each second SRS port is associated with at least two antenna ports may include:

Each first SRS port is associated with one antenna port, each second SRS port corresponds to a plurality of first SRS ports, and different spatial relationship information is configured for second SRS resources to which a plurality of second SRS ports corresponding to a same first SRS port belong.

In a possible implementation, the apparatus 800 may further include a sending module 803, configured to send an SRS on the at least one first SRS resource and the at least one second SRS resource, where the indication information is generated by the network device based on the SRS, and the at least one first SRS resource and/or the at least one second SRS resource are/is configured by the network device.

A dashed box in FIG. 8 indicates that the sending module 803 is optional for the apparatus 800.

In a possible implementation, the indication information may include:

an index value, in a first subset, of a combination of an SRS resource ID and an SRS port ID of the SRS resource corresponding to the receive antenna.

The first subset may include:

an SRS resource ID and an SRS port ID of an SRS resource corresponding to each of a plurality of receive antenna combinations, and an index value of a combination of the SRS resource ID and the SRS port ID of the SRS resource corresponding to each receive antenna combination.

The index value of the combination of the SRS resource ID and the SRS port ID of the SRS resource corresponding to each receive antenna combination is unique in the first subset.

In a possible implementation, the apparatus 800 may further include:

the sending module 803, configured to: before the receiving module 801 receives the indication information from the network device, send antenna information of the apparatus 800 to the network device, where the antenna information corresponds to the first subset, the first subset is one of a plurality of subsets, and the plurality of subsets correspond to different antenna information.

In a possible implementation, the antenna information may include one or more of the following: a quantity of radio frequency transmit channels, a quantity of radio frequency receive channels, a total quantity of antenna ports, or a quantity of analog beams, where one analog beam is generated by at least two antenna ports.

Based on the same technical concept, an embodiment of this disclosure further provides a signal sending apparatus 900. The apparatus 900 may be a network device or an apparatus 900 on the network device. The apparatus 900 may include modules configured to perform the method in FIG. 3 or FIG. 4.

Figure 9:
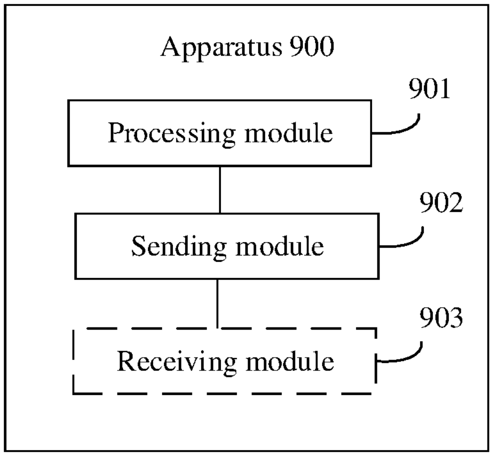
FIG. 9 is a schematic diagram of a structure of a signal sending apparatus 900 according to an embodiment of this disclosure.

Refer to FIG. 9. The apparatus 900 may include:

a processing module 901, configured to generate indication information, where the indication information indicates at least one sounding reference signal SRS resource, and the at least one SRS resource corresponds to a receive antenna to be used by a terminal device to receive a downlink signal; and a sending module 902, configured to: send the indication information to the terminal device, and send the downlink signal to the terminal device.

In a possible implementation, that the at least one SRS resource corresponds to a receive antenna to be used by a terminal device to receive a downlink signal may include:

The at least one SRS resource includes at least one first SRS resource and at least one second SRS resource, where each of the at least one first SRS resource includes at least one first SRS port, and each first SRS port is associated with one antenna port; and each of the at least one second SRS resource includes at least one second SRS port, and each second SRS port is associated with at least two antenna ports.

In a possible implementation, the processing module 901 is configured to:

determine a first SRS resource corresponding to a first receive antenna port of the terminal device and a second SRS resource corresponding to a second receive antenna port and a receive beam of the terminal device; and generate the indication information based on the first SRS resource corresponding to the first receive antenna port of the terminal device and the second SRS resource corresponding to the second receive antenna port and the receive beam of the terminal device.

In a possible implementation, that each second SRS port is associated with at least two antenna ports may include:

Each first SRS port is associated with one antenna port, each second SRS port corresponds to a plurality of first SRS ports, and different spatial relationship information is configured for second SRS resources to which a plurality of second SRS ports corresponding to a same first SRS port belong.

In a possible implementation, the apparatus 900 may further include:

a receiving module 903, configured to receive an SRS from the terminal device on the at least one first SRS resource and the at least one second SRS resource, where the first receive antenna port of the terminal device and the second receive antenna port and the receive beam of the terminal device are determined by the apparatus 900 based on the SRS, and the at least one first SRS resource and the at least one second SRS resource are configured by the apparatus 900.

A dashed box in FIG. 9 indicates that the receiving module 903 is optional for the apparatus 900.

In a possible implementation, the indication information may include:

an index value, in a first subset, of a combination of an SRS resource ID and an SRS port ID of the SRS resource corresponding to the receive antenna.

The first subset may include:

an SRS resource ID and an SRS port ID of an SRS resource corresponding to each of a plurality of receive antenna combinations, and an index value of a combination of the SRS resource ID and the SRS port ID of the SRS resource corresponding to each receive antenna combination.

The index value of the combination of the SRS resource ID and the SRS port ID of the SRS resource corresponding to each receive antenna combination is unique in the first subset.

In a possible implementation, the apparatus 900 may further include:

the receiving module 903, configured to: before the processing module 901 generates the indication information, receive antenna information from the terminal device, where the antenna information corresponds to the first subset, the first subset is one of a plurality of subsets, and the plurality of subsets correspond to different antenna information.

In a possible implementation, the antenna information may include one or more of the following: a quantity of radio frequency transmit channels, a quantity of radio frequency receive channels, a total quantity of antenna ports, or a quantity of analog beams, where one analog beam is generated by at least two antenna ports.

Figure 10:
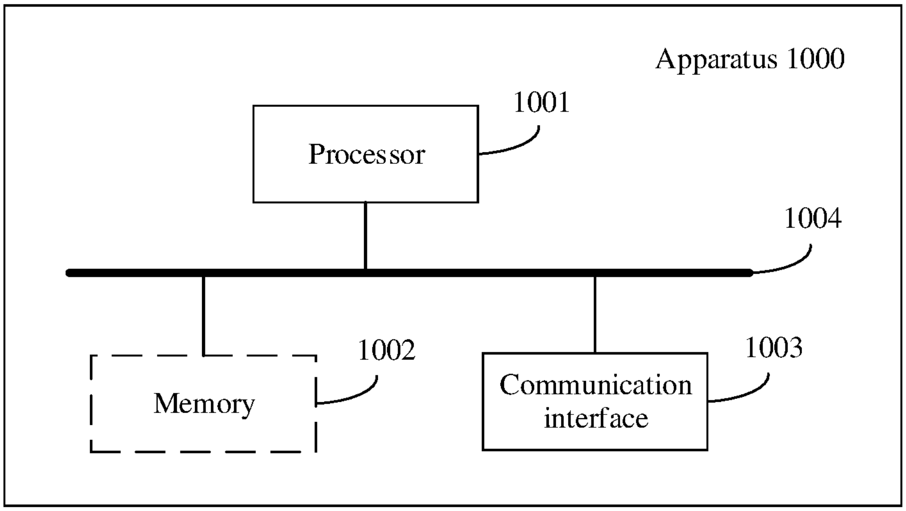
FIG. 10 is a schematic diagram of a structure of a communication apparatus 1000 according to an embodiment of this disclosure.

Refer to FIG. 10. Based on the same technical concept, an embodiment of this disclosure further provides a communication apparatus 1000, including:

at least one processor 1001, and a memory 1002 and a communication interface 1003 that communicate with and are connected to the at least one processor.

The memory 1002 stores instructions executable by the at least one processor 1001, and the at least one processor 1001 executes the instructions stored in the memory, to enable the apparatus 1000 to perform the method in FIG. 3 or FIG. 4.

Optionally, the memory 1002 is located outside the apparatus 1000.

Optionally, the apparatus 1000 includes the memory 1002, the memory 1002 is connected to the at least one processor 1001, and the memory 1002 stores the instructions executable by the at least one processor 1001. In FIG. 10, a dashed line indicates that the memory 1002 is optional for the apparatus 1000.

The processor 1001 and the memory 1002 may be coupled via an interface circuit, or may be integrated together. This is not limited herein.

A specific connection medium among the processor 1001, the memory 1002, and the communication interface 1003 is not limited in this embodiment of this disclosure. In this embodiment of this disclosure, the processor 1001, the memory 1002, and the communication interface 1003 are connected through a bus 1004 in FIG. 10. The bus is represented by a bold line in FIG. 10. A manner of connecting other components is merely an example for description, and is not limited thereto. The bus may be classified into an address bus, a data bus, a control bus, and the like. For ease of representation, only one thick line is for representing the bus in FIG. 10, but this does not mean that there is only one bus or only one type of bus.

It should be understood that the processor in embodiments of this disclosure may be implemented by hardware or may be implemented by software. When the processor is implemented by hardware, the processor may be a logic circuit, an integrated circuit, or the like. When the processor is implemented by software, the processor may be a general-purpose processor, and is implemented by reading software code stored in the memory.

For example, the processor may be a central processing unit (CPU), or may be another general-purpose processor, a digital signal processor (DSP), an application-specific integrated circuit (ASIC), a field programmable gate array (FPGA), another programmable logic device, a discrete gate, a transistor logic device, or a discrete hardware component. The general-purpose processor may be a microprocessor, or the processor may be any conventional processor or the like.

It should be understood that the memory in embodiments of this disclosure may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (random access memory, RAM), used as an external cache. By way of example and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA, another programmable logic device, a discrete gate, a transistor logic device, or a discrete hardware component, the memory (a storage module) may be integrated into the processor.

It should be noted that the memory described in this specification aims to include but is not limited to these memories and any memory of another appropriate type.

Based on the same technical concept, an embodiment of this disclosure further provides a computer-readable storage medium, including a program or instructions. When the program or the instructions is/are run on a computer, the method in FIG. 3 or FIG. 4 is performed.

Based on the same technical concept, an embodiment of this disclosure further provides a computer program product. When the computer program product runs on a computer, the method in FIG. 3 or FIG. 4 is performed.

Based on the same technical concept, an embodiment of this disclosure further provides a chip. The chip is coupled to a memory, and is configured to read and execute program instructions stored in the memory, to implement the method in FIG. 3 or FIG. 4.

All related content of the steps in the foregoing method embodiments may be cited in function descriptions of the corresponding functional modules. Details are not described herein again.

Embodiments of this application are described with reference to the flowcharts and/or block diagrams of the method, the device (system), and the computer program product according to embodiments of this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to embodiments of this disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

Clearly, a person skilled in the art can make various modifications and variations to embodiments of this disclosure without departing from the spirit and scope of this disclosure. This disclosure is intended to cover these modifications and variations of embodiments of this disclosure provided that they fall within the scope of protection defined by the following claims and their equivalent technologies.

What is claimed is:

1. A signal receiving method comprising:

sending, by a terminal device, a sounding reference signal (SRS) on at least one first SRS resource and at least one second SRS resource, wherein indication information is generated by a network device based on the SRS, wherein the at least one first SRS resource and the at least one second SRS resource are/is configured by a network device, and wherein the terminal device switches only a transmit antenna port to send the SRS, but does not switch a receive antenna port to receive a channel state information-reference signal (CSI-RS);

receiving, by the terminal device, the indication information from the network device, wherein the indication information indicates at least one sounding reference signal (SRS) resource, and the at least one SRS resource comprises the at least one first SRS resource and the at least one second SRS resource, wherein each of the at least one first SRS resource comprises at least one first SRS port, and each of the at least one first SRS port is associated with one antenna port; and each of the at least one second SRS resource comprises at least one second SRS port, and each of the at least one second SRS port is associated with at least two antenna ports; and receiving, by the terminal device, a downlink signal from the network device by using a receive antenna, the receive antenna corresponding to the at least one SRS resource comprising the at least one first SRS resource and the at least one second SRS resource.

2. The method according to claim 1, wherein the receiving, by the terminal, of the downlink signal from the network device by using the receive antenna corresponding to the at least one SRS resource comprises:

determining, by the terminal device, a first receive antenna port based on the first SRS resource in the at least one SRS resource, determining a second receive antenna port and a receive beam based on the second SRS resource in the at least one SRS resource, and receiving the downlink signal from the network device by using the first receive antenna port, the second receive antenna port, and the receive beam.

3. The method according to claim 1, wherein each of the at least one second SRS port corresponds to a plurality of first SRS ports, and different spatial relationship information is configured for second SRS resources to which a plurality of second SRS ports corresponding to a same first SRS port belong.

4. The method according to claim 1, wherein the indication information comprises:

an index value, in a first subset, of a combination of an SRS resource ID and an SRS port ID of the SRS resource corresponding to the receive antenna; and the first subset comprises:

the SRS resource ID and the SRS port ID of the SRS resource corresponding to each of a plurality of receive antenna combinations, and an index value of a combination of the SRS resource ID and the SRS Port ID of the SRS resource corresponding to each of the plurality of receive antenna combinations, wherein the index value of the combination of the SRS resource ID and the SRS port ID of the SRS resource corresponding to each of the plurality of receive antenna combinations is unique in the first subset.

5. The method according to claim 1, wherein:

each of the first and second SRS ports is virtualized and indicates the antenna port for sending the SRS; and each of the antenna ports is an actual physical antenna port.

6. A signal method comprising:

receiving, by a network device, a sounding reference signal (SRS) from a terminal device on the at least one first SRS resource and at least one second SRS resource, generating, by the network device, indication information based on the SRS, wherein the at least one first SRS resource and the at least one second SRS resource are configured by the network device, and wherein the terminal device needs to switch only a transmit antenna port to send the SRS, but does not need to switch a receive antenna port to receive a channel state information-reference signal (CSI-RS);

sending, by the network device, the indication information to the terminal device, wherein the indication information indicates at least one sounding reference signal (SRS) resource, and the at least one SRS resource comprises the at least one first SRS resource and the at least one second SRS resource, wherein each of the at least one first SRS resource comprises at least one first SRS port, and each of the at least one first SRS port is associated with one antenna port; and each of the at least one second SRS resource comprises at least one second SRS port, and each of the at least one second SRS port is associated with at least two antenna ports; and sending, by the network device, a downlink signal to the terminal device for reception of the downlink signal by the terminal device using a receive antenna, the receive antenna corresponding to the at least one SRS resource comprising the at least one first SRS resource and the at least one second SRS resource.

7. The method according to claim 6, further comprising:

determining, by the network device, the first SRS resource corresponding to a first receive antenna port of the terminal device and the second SRS resource corresponding to a second receive antenna port and a receive beam of the terminal device; and generating, by the network device, the indication information based on the first SRS resource corresponding to the first receive antenna port of the terminal device and the second SRS resource corresponding to the second receive antenna port and the receive beam of the terminal device.

8. The method according to claim 6, wherein each of the at least one second SRS port corresponds to a plurality of first SRS ports, and different spatial relationship information is configured for second SRS resources to which a plurality of second SRS ports corresponding to a same first SRS port belong.

9. The method according to claim 6, wherein the indication information comprises:

an index value, in a first subset, of a combination of an SRS resource ID and an SRS Port ID of the SRS resource corresponding to the receive antenna; and the first subset comprises:

the SRS resource ID and the SRS port ID of the SRS resource corresponding to each of a plurality of receive antenna combinations, and an index value of a combination of the SRS resource ID and the SRS port ID of the SRS resource corresponding to each of the plurality of receive antenna combinations, wherein the index value of the combination of the SRS resource ID and the SRS port ID of the SRS resource corresponding to each of the plurality of receive antenna combinations is unique in the first subset.

10. The method according to claim 6, wherein:

each of the first and second SRS ports is virtualized and indicates the antenna port for sending the SRS; and each of the antenna ports is an actual physical antenna port.

11. A signal receiving apparatus comprising:

at least one processor; and a memory storing programming instructions for execution by the at least one processor, the programming instructions instructing the signal receiving apparatus to perform operations comprising:

sending a sounding reference signal (SRS) on at least one first SRS resource and at least one second SRS resource, wherein indication information is generated by a network device based on the SRS, wherein the at least one first SRS resource and the at least one second SRS resource are configured by a network device, and wherein the signal receiving apparatus is configured to switch a only a transmit antenna port to send the SRS, but not to switch a receive antenna port to receive a channel state information-reference signal (CSI-RS);

receiving the indication information from the network device, wherein the indication information indicates at least one sounding reference signal (SRS) resource, and the at least one SRS resource comprises the at least one first SRS resource and the at least one second SRS resource, wherein each of the at least one first SRS resource comprises at least one first SRS Port, and each of the at least one first SRS port is associated with one antenna port; and each of the at least one second SRS resource comprises at least one second SRS port, and each of the at least one second SRS port is associated with at least two antenna ports; and receiving a downlink signal from the network device by using a receive antenna, the receive antenna corresponding to the at least one SRS resource comprising the at least one first SRS resource and the at least one second SRS resource.

12. The apparatus according to claim 11, wherein the receiving of the downlink signal from the network device by using the receive antenna corresponding to the at least one SRS resource comprises:

determining a first receive antenna port based on the first SRS resource in the at least one SRS resource, determining a second receive antenna port and a receive beam based on the second SRS resource in the at least one SRS resource, and receiving the downlink signal from the network device by using the first receive antenna port, the second receive antenna port, and the receive beam.

13. The apparatus according to claim 11, wherein each of the at least one second SRS port corresponds to a plurality of first SRS ports, and different spatial relationship information is configured for second SRS resources to which a plurality of second SRS ports corresponding to a same first SRS Port belong.

14. The apparatus according to claim 11, wherein the indication information comprises:

an index value, in a first subset, of a combination of a SRS resource ID and a SRS port ID of the SRS resource corresponding to the receive antenna; and the first subset comprises:

the SRS resource ID and the SRS port ID of the SRS resource corresponding to each of a plurality of receive antenna combinations, and the index value of a combination of the SRS resource ID and the SRS port ID of the SRS resource corresponding to each of the plurality of receive antenna combinations, wherein the index value of the combination of the SRS resource ID and the SRS port ID of the SRS resource corresponding to each of the plurality of receive antenna combinations is unique in the first subset.

15. The apparatus according to claim 11, wherein:

each of the first and second SRS ports is virtualized and indicates the antenna port for sending the SRS; and each of the antenna ports is an actual physical antenna port.

16. A signal sending apparatus comprising:

at least one processor; and a memory storing programming instructions for execution by the at least one processor, the programming instructions instructing the signal sending apparatus to perform operations comprising:

receiving a sounding reference signal (SRS) from a terminal device on at least one first SRS resource and at least one second SRS resource, generating indication information based on the SRS, wherein the at least one first SRS resource and the at least one second SRS resource are configured by a network device, and wherein the terminal device needs to switch only a transmit antenna port to send the SRS, but does not need to switch a receive antenna port to receive a channel state information-reference signal (CSI-RS);

sending the indication information to the terminal device, wherein the indication information indicates at least one sounding reference signal (SRS) resource, and the at least one SRS resource comprises the at least one first SRS resource and the at least one second SRS resource, wherein each of the at least one first SRS resource comprises at least one first SRS port, and each first SRS port is associated with one antenna port; and each of the at least one second SRS resource comprises at least one second SRS port, and each second SRS port is associated with at least two antenna ports; and sending a downlink signal to the terminal device for reception of the downlink by the terminal device using a receive antenna corresponding to the at least one SRS resource comprising the at least one first SRS resource and the at least one second SRS resource.

17. The apparatus according to claim 16, wherein the operations further comprises:

determining the first SRS resource corresponding to a first receive antenna port of the terminal device and the second SRS resource corresponding to a second receive antenna port and a receive beam of the terminal device; and generating the indication information based on the first SRS resource corresponding to the first receive antenna port of the terminal device and the second SRS resource corresponding to the second receive antenna port and the receive beam of the terminal device.

18. The apparatus according to claim 16, wherein each of the at least one second SRS port corresponds to a plurality of first SRS ports, and different spatial relationship information is configured for second SRS resources to which a plurality of second SRS ports corresponding to a same first SRS port belong.

19. The apparatus according to claim 16, wherein the indication information comprises:

an index value, in a first subset, of a combination of an SRS resource ID and an SRS port ID of the SRS resource corresponding to the receive antenna; and the first subset comprises:

the SRS resource ID and the SRS Port ID of the SRS resource corresponding to each of a plurality of receive antenna combinations, and an index value of a combination of the SRS resource ID and the SRS port ID of the SRS resource corresponding to each of the plurality of receive antenna combinations, wherein the index value of the combination of the SRS resource ID and the SRS port ID of the SRS resource corresponding to each of the plurality of receive antenna combinations is unique in the first subset.

20. The apparatus according to claim 16, wherein:

each of the first and second SRS ports is virtualized and indicates the antenna port for sending the SRS; and each of the antenna ports is an actual physical antenna port.

* * * * *